United States Patent
Williams et al.

(10) Patent No.: US 6,988,082 B1
(45) Date of Patent: Jan. 17, 2006

(54) COMPUTERIZED SYSTEMS AND METHODS FOR FACILITATING THE FLOW OF CAPITAL THROUGH THE HOUSING FINANCE INDUSTRY

(75) Inventors: Michael J. Williams, Potomac, MD (US); David N. Voth, Oakton, VA (US); Kimberly J. Hirsch, Reston, VA (US); Michael W. Koch, Bittinger, MD (US); Peter G. Kopperman, Bethesda, MD (US); Richard N. Plotnick, Fairfax, VA (US); Martin T. Schulz, McLean, VA (US); Peter A. Simon, Washington, DC (US)

(73) Assignee: Fannie Mae, Washington, DC (US)

( * ) Notice: Subject to any disclaimer, the term of this patent is extended or adjusted under 35 U.S.C. 154(b) by 0 days.

(21) Appl. No.: 10/331,680

(22) Filed: Dec. 30, 2002

Related U.S. Application Data

(62) Division of application No. 09/593,106, filed on Jun. 13, 2000.

(51) Int. Cl.
*G06F 17/60* (2006.01)

(52) U.S. Cl. .............................. 705/36; 705/35; 705/37
(58) Field of Classification Search .............. 705/35–40
See application file for complete search history.

(56) References Cited

U.S. PATENT DOCUMENTS

| | | | |
|---|---|---|---|
| 3,316,395 A | 4/1967 | Lavin | |
| 4,876,648 A | 10/1989 | Lloyd | |
| 5,239,462 A | 8/1993 | Jones et al. | |
| 5,262,941 A | 11/1993 | Saladin et al. | |

(Continued)

FOREIGN PATENT DOCUMENTS

| | | |
|---|---|---|
| WO | WO 99/48036 | 9/1999 |
| WO | WO 00/21011 | 4/2000 |
| WO | WO 01/27832 A1 | 4/2001 |
| WO | WO 01/41019 A2 | 6/2001 |

OTHER PUBLICATIONS

Amendment and Reply Under 37 CFR 1.111, dated Aug. 8, 2003, for copending U.S. Appl. No. 09/593,106, which is the parent of U.S. Appl. No. 10/331,680.

(Continued)

*Primary Examiner*—Hani Kazimi
*Assistant Examiner*—Narayanswamy Subramanian
(74) *Attorney, Agent, or Firm*—Foley & Lardner LLP

(57) ABSTRACT

Computerized systems and methods facilitate the flow of capital through the housing finance industry. A system for determining an interest rate quote and points for a mortgage loan that are specific to a borrower includes input means for obtaining borrower and mortgage loan information, means for retrieving underwriting characteristics and means for calculating the interest rate quote and points based on the borrower and mortgage loan information and based on the underwriting characteristics. The means for calculating includes means for retrieving a required yield which reflects market conditions in a secondary mortgage market including being indicative of a price that can be obtained for the mortgage loan in the secondary mortgage market. The calculating means also includes means for determining an adjustment to the required yield associated with the mortgage loan based on credit risk posed by the borrower, the credit risk adjustment being determined as a function of at least a credit score, a loan-to-value ratio, and a mortgage loan purpose for the mortgage loan and the borrower. The calculating means further includes means for determining other adjustments to the required yield based on other parameters related to the mortgage loan and/or the borrower. The interest rate quote and points are calculated as a function of the required yield adjusted by the credit risk adjustment and the other adjustments.

25 Claims, 39 Drawing Sheets

U.S. PATENT DOCUMENTS

| | | | |
|---|---|---|---|
| 5,274,547 A | 12/1993 | Zoffel et al. | |
| 5,323,315 A | 6/1994 | Highbloom | |
| 5,414,621 A | 5/1995 | Hough | |
| 5,611,052 A | 3/1997 | Dykstra et al. | |
| 5,696,907 A | 12/1997 | Tom | |
| 5,699,527 A | 12/1997 | Davidson | |
| 5,732,400 A | 3/1998 | Mandler et al. | |
| 5,765,144 A | 6/1998 | Larche et al. | |
| 5,797,133 A | 8/1998 | Jones et al. | |
| 5,870,721 A | 2/1999 | Norris | |
| 5,878,403 A | 3/1999 | DeFrancesco et al. | 705/38 |
| 5,930,776 A | 7/1999 | Dykstra et al. | |
| 5,940,811 A | 8/1999 | Norris | |
| 5,940,812 A | 8/1999 | Tengel et al. | |
| 5,966,699 A | 10/1999 | Zandi | |
| 5,970,464 A | 10/1999 | Apte et al. | |
| 5,983,206 A | 11/1999 | Oppenheimer | |
| 5,995,947 A | 11/1999 | Fraser et al. | |
| 6,014,645 A | 1/2000 | Cunningham | |
| 6,029,149 A * | 2/2000 | Dykstra et al. | 705/38 |
| 6,088,686 A | 7/2000 | Walker et al. | |
| 6,112,190 A | 8/2000 | Fletcher et al. | |
| 6,119,103 A | 9/2000 | Basch et al. | |
| 6,125,349 A | 9/2000 | Maher | |
| 6,144,948 A | 11/2000 | Walker et al. | |
| 6,202,053 B1 | 3/2001 | Christiansen et al. | |
| 6,226,624 B1 | 5/2001 | Watson et al. | |
| 6,289,319 B1 | 9/2001 | Lockwood | |
| 6,311,169 B2 | 10/2001 | Duhon | |
| 6,385,594 B1 | 5/2002 | Lebda et al. | 705/38 |
| 6,405,181 B2 | 6/2002 | Lent et al. | |
| 6,438,526 B1 | 8/2002 | Dykes et al. | |
| 6,505,176 B2 | 1/2003 | DeFrancesco, Jr. et al. | |
| 6,584,467 B1 | 6/2003 | Haught et al. | |
| 6,594,635 B1 | 7/2003 | Erlanger | |
| 2001/0029482 A1 | 10/2001 | Tealdi et al. | |
| 2001/0032178 A1 | 10/2001 | Adams et al. | |
| 2002/0052815 A1 | 5/2002 | Johnson et al. | |
| 2003/0033242 A1 | 2/2003 | Lynch et al. | |
| 2003/0229581 A1 | 12/2003 | Green et al. | |
| 2004/0002915 A1 | 1/2004 | McDonald et al. | |

OTHER PUBLICATIONS

Reply and Amendment, dated Dec. 23, 2002, for copending U.S. Appl. No. 90/593,106, which is the parent of U.S. Appl. No. 10/331,680.

Non-final Office Action for U.S. Appl. No. 09/593,106, dated Apr. 10, 2003.

Non-final Office Action for U.S. Appl. No. 09/593,106, dated Aug. 30, 2002.

Home Shark Prequalification website materials Feb. 1, 1999, https://loanforms.homeshark.com/secure/CAnalysis.

Home Shark Loan Application website materials Feb. 1, 1999, https://loanforms.homeshark.com/secure.

E–LOAN; Qualify For a Loan, Pre–Qualifying Interview website materials Feb. 1, 1999, http://e–loan.com/cgi–bin.

iQualify.com; Loan Application website materials Feb. 1, 1999, http://secure01.iqualify.com/scripts/prodselectupd.

Lending Tree, Mortgage, Apply Online website materials Feb. 1, 1999, https://loans./lendingtree.com.

REASA Real Estate Automated Service Associates, LLC website materials (www.reasa.com).

* cited by examiner

CAPTURE APPLICATION INFORMATION: LOAN TYPE AND CREDIT AUTHORIZATION

FILE  EDIT  VIEW  GO  COMMUNICATOR  HELP

30 YR. FIXED: | OURS 7.20 (APR 7.21) | THEIRS 7.25 (APR 7.26) | MORE

THE SIMPLER WAY TO A BETTER HOME LOAN

GET A [HOME LOAN]
▫ WHAT TYPE OF HOME LOAN WOULD YOU LIKE?
CHOOSE ONE OF THE FOLLOWING.
◉ YOU'VE FOUND A HOME AND ARE READY TO BUY.
○ YOU'RE READY TO REFINANCE.
○ YOU WANT TO BE APPROVED BEFORE YOU BEGIN HOME SHOPPING.

BEGINNING THE LOAN APPLICATION.
HOW MANY BORROWERS WILL THERE BE ON THIS LOAN APPLICATION?   ◉ ONE   ○ TWO
ARE YOU AUTHORIZED TO OBTAIN CREDIT INFORMATION ON ALL BORROWERS, AND CAN WE OBTAIN CREDIT INFORMATION ON ALL BORROWERS NOW?   ◉ YES   ○ NO

IN ORDER TO COMPLETE YOUR LOAN APPLICATION, WE (AND OUR AGENTS, SUCCESSORS AND ASSIGNS) MUST ACCESS CREDIT REPORTS FOR ALL BORROWERS AND VERIFY, RETAIN, OR CONFIRM ANY INFORMATION IN YOUR LOAN APPLICATION.

◁ GO BACK        PROCEED TO STEP 1 ▷

CAPTURE APPLICATION INFORMATION: PROPERTY (PURCHASE)

FILE  EDIT  VIEW  GO  COMMUNICATOR  HELP

30 YR. FIXED: | OURS 7.20 (APR 7.21) | THEIRS 7.25 (APR 7.26) | MORE

STEP 2

YOU'VE FOUND A HOME AND ARE READY TO BUY
☐ STEP 2 OF 5: ABOUT THE HOME YOU ARE PLANNING TO PURCHASE

HOME DETAILS

PLEASE PROVIDE THE FOLLOWING INFORMATION IF IT APPLIES TO YOU. IF NOT, LEAVE BLANK.

I WILL USE THE HOME AS [PRIMARY RESIDENCE ▼]
HOME TYPE [SINGLE FAMILY DETACHED ▼]
UNIT TYPE [N/A] IF HOME TYPE IS CONDOMINIUM, SPECIFY UNIT TYPE.
ADDRESS LINE 1 [            ]
ADDRESS LINE 2 [            ] OPTIONAL
CITY [            ]
STATE [SELECT STATE ▼]
ZIP CODE [      ]
PURCHASE PRICE $[      ]
APPROXIMATE CLOSING DATE [        ] (MM/DD/YYYY)

THIS DATE IS SPECIFIED IN YOUR PURCHASE AND SALES CONTRACT. WE NEED THE DATE TO CALCULATE CLOSING COSTS.

◁ GO BACK     SAVE AND CONTINUE LATER     PROCEED TO STEP 3 ▷

FIG. 2e

CAPTURE APPLICATION INFORMATION: PROPERTY (REFINANCE TRANSACTION)

FILE  EDIT  VIEW  GO  COMMUNICATOR  HELP

BACK  FORWARD  REFRESH  HOME  SEARCH  FAVORITES  PRINT  SECURITY  STOP

ADDRESS

STEP 2

GET A HOME [LOAN]  YOU'RE READY TO REFINANCE.
▫ STEP 2 OF 5: ABOUT THE HOME YOU ARE PLANNING TO REFINANCE

HOME DETAILS
PLEASE PROVIDE THE FOLLOWING INFORMATION IF IT APPLIES TO YOU. IF NOT, LEAVE BLANK.
I WILL USE THE HOME AS [PRIMARY RESIDENCE ▶]
HOME TYPE [SINGLE FAMILY DETACHED ▶]
UNIT TYPE [N/A] IF HOME TYPE IS CONDOMINIUM, SPECIFY UNIT TYPE.
ADDRESS LINE 1 [                    ]
ADDRESS LINE 2 [          ] OPTIONAL
CITY [                    ]
STATE [MAINE ▶]
ZIP CODE [11111]
AMOUNT REFINANCING $[10,000.00]
PROPERTY APPRAISED VALUE $[1,111.00]
APPROXIMATE CLOSING DATE [04/30/2000]
(MM /DD /YYYY)

THIS DATE IS SPECIFIED IN YOUR PURCHASE AND SALES CONTRACT. WE NEED THE DATE TO CALCULATE CLOSING COSTS.

◁ GO BACK        ( SAVE AND CONTINUE LATER )        PROCEED TO STEP 3 ▷

FIG. 2f

CAPTURE APPLICATION INFORMATION: EMPLOYMENT AND INCOME

FILE EDIT VIEW GO COMMUNICATOR HELP

YOU'VE FOUND A HOME AND ARE [READY TO BUY]
☐ STEP 3 OF 5: ABOUT YOUR EMPLOYMENT AND INCOME

SELF EMPLOYMENT
 ARE YOU SELF-EMPLOYED? [NO ▼]

INCOME FOR A
PLEASE PROVIDE THE FOLLOWING INFORMATION. WE WILL VERIFY THIS INFORMATION
LATER TO ENSURE THAT YOU CAN AFFORD YOUR MONTHLY HOME LOAN PAYMENTS.
 GROSS SALARY $ [     ] ANNUAL

OTHER SOURCES OF INCOME THAT WILL BE USED TOWARDS PURCHASE OF HOME
PLEASE PROVIDE THE FOLLOWING INFORMATION IF IT APPLIES TO YOU. IF NOT, LEAVE BLANK.
 BONUSES $ [     ] AVG. ANNUAL OVER PAST 2 YEARS
 COMMISSIONS $ [     ] AVG. ANNUAL OVER PAST 2 YEARS
 OVERTIME $ [     ] AVG. ANNUAL OVER PAST 2 YEARS
 PENSION / RETIREMENT $ [     ] MONTHLY
 SOCIAL SECURITY / DISABILITY $ [     ] MONTHLY
 DIVIDENDS AND INTEREST $ [     ] MONTHLY
 RENTAL INCOME $ [     ] MONTHLY
 ALIMONY / CHILD SUPPORT $ [     ] MONTHLY. LEAVE BLANK IF YOU DON'T WANT
  IT CONSIDERED FOR YOUR HOME LOAN
 OTHER INCOME $ [     ] MONTHLY

◁ GO BACK TO STEP 2    SAVE AND CONTINUE LATER    PROCEED TO STEP 4 ▷

FIG. 2g

CAPTURE APPLICATION INFORMATION: ASSETS

FILE  EDIT  VIEW  GO  COMMUNICATOR  HELP

YOU'VE FOUND A HOME AND ARE [READY TO BUY]
☐ STEP 4 OF 5: ABOUT YOUR ASSETS

CURRENT CASH VALUE OF ASSETS
PLEASE PROVIDE THE FOLLOWING INFORMATION IF IT APPLIES TO YOU. IF NOT, LEAVE BLANK. WE WILL VERIFY THIS INFORMATION LATER TO ENSURE THAT YOU HAVE ENOUGH CASH FOR YOUR DOWN PAYMENT AND CLOSING COSTS.

SAVINGS $ [    ]
CHECKING $ [    ]
GIFT MONEY $ [    ]
CASH VALUE OF STOCKS, MUTUAL FUNDS, CDS $ [    ]
CASH VALUE OF 401(K), IRA, KEOGH $ [    ]
CASH FROM SALE OF PROPERTY $ [    ] LEAVE BLANK IF YOU ARE NOT USING CASH FROM SALE OF HOME.
OTHER $ [    ] THE AMOUNT OF MONEY YOU ALREADY SUBMITTED WITH YOUR
SALES CONTRACT DEPOSIT $ [    ] PURCHASE AND SALES CONTRACT ON THE HOME.

WHAT PROPERTIES DO YOU OWN NOW? IF NONE, CLICK "LET'S CONTINUE". PLEASE INDICATE PROPERTIES THAT YOU CURRENTLY OWN. CHECK ALL THAT APPLY. WE WILL VERIFY THESE PROPERTIES ON YOUR CREDIT REPORT.

☐ CURRENT RESIDENCE
☐ RENTAL PROPERTY
☐ VACATION HOME
☐ OTHER

◁ GO BACK TO STEP 3  ⟩ SAVE AND CONTINUE LATER  ⟩ LET'S CONTINUE ▷

FIG. 2h

CAPTURE APPLICATION INFORMATION: CURRENT HOME LOANS

FILE EDIT VIEW GO COMMUNICATOR HELP

30 YR. FIXED: OURS 7.20 (APR 7.21) THEIRS 7.25 (APR 7.26) MORE

STEP 4

YOU'VE FOUND A HOME AND ARE READY TO BUY
STEP 4 OF 5 (CONT): CURRENT HOME LOANS

HOME LOANS

PLEASE VERIFY THE INFORMATION BELOW OBTAINED FROM YOUR CREDIT REPORT.

| DATE OF HOME LOAN | MONTHLY PAYMENT | CURRENT BALANCE | |
|---|---|---|---|
| 03/15/1992 | $1,075.00 | $9,232.00 | USE OF PROPERTY: CURRENT RESIDENCE ▸ |

WILL THIS LOAN BE PAID OFF WHEN YOU CLOSE ON YOUR NEW HOME? ○YES ○NO

| 03/15/1992 | $398.00 | $5,342.00 | RENTAL PROPERTY ▸ |

WILL THIS LOAN BE PAID OFF WHEN YOU CLOSE ON YOUR NEW HOME? ○YES ○NO

◁ GO BACK    SAVE AND CONTINUE LATER    PROCEED TO STEP 5 ▷

| FILE  EDIT  VIEW  GO  COMMUNICATOR  HELP | |
|---|---|
| CLOSING DATE: 04 / 30 / 2000 | |
| INCOME SUMMARY | |
| SUMMARY MONTHLY INCOME: | $3,212.56 |
| CURRENT CASH VALUE OF ASSETS: | $1,234.56 |
| CURRENT HOME LOAN BALANCES TO BE PAID OFF AT CLOSING: | $1,234.56 |
| OTHER OUTSTANDING HOME LOAN BALANCES: | $0.00 |
| HOME LOAN SUMMARY | |
| PURCHASE PRICE: | $200,000.00 |
| LOAN TYPE: | 30 YEAR FIXED RATE |
| SALES CONTRACT DEPOSIT: | $0.00 |
| DOWN PAYMENT: | $0.00 |
| REMAINING DOWN PAYMENT: | $0.00 |
| HOME OWNER ASSOCIATION DUES: | $0.00 |
| CLOSING COSTS PAID BY SELLER: | $0.00 |

◁ GO BACK        SAVE AND CONTINUE LATER        LET'S CONTINUE ▷

FIG. 2m

FILE EDIT VIEW GO COMMUNICATOR HELP

CLOSING DATE: 04/30/2000
INCOME SUMMARY
SUMMARY MONTHLY INCOME: $3,212.56
CURRENT CASH VALUE OF ASSETS: $1,234.56
CURRENT HOME LOAN BALANCES TO BE PAID OFF AT CLOSING: $1,234.56
OTHER OUTSTANDING HOME LOAN BALANCES: $0.00

HOME LOAN SUMMARY
PURCHASE PRICE: $200,000.00
LOAN TYPE: 30 YEAR FIXED RATE
SALES CONTRACT DEPOSIT: $0.00
DOWN PAYMENT: $0.00
REMAINING DOWN PAYMENT: $0.00
HOME OWNER ASSOCIATION DUES: $0.00
CLOSING COSTS PAID BY SELLER: $0.00

◁ GO BACK    ( SAVE AND CONTINUE LATER )    LET'S CONTINUE ▷

FIG. 2n

FILE EDIT VIEW GO COMMUNICATOR HELP

CLOSING DATE: 04 /30 /2000
INCOME SUMMARY
SUMMARY MONTHLY INCOME: $3,212.56
CURRENT CASH VALUE OF ASSETS: $1,234.56
CURRENT HOME LOAN BALANCES TO BE PAID OFF AT CLOSING: $1,234.56
OTHER OUTSTANDING HOME LOAN BALANCES: $0.00

HOME LOAN SUMMARY
PURCHASE PRICE: $200,000.00
LOAN TYPE: 30 YEAR FIXED RATE
SALES CONTRACT DEPOSIT: $0.00
DOWN PAYMENT: $0.00
REMAINING DOWN PAYMENT: $0.00
HOME OWNER ASSOCIATION DUES: $0.00
CLOSING COSTS PAID BY SELLER: $0.00

◁ GO BACK    SAVE AND CONTINUE LATER    LET'S CONTINUE ▷

FIG. 20

| | |
|---|---|
| □YOU HAVE BEEN APPROVED FOR A 30 YEAR FIXED RATE HOME LOAN YOUR APPROVAL # IS 234234234 YOUR HOME LOAN QUALIFIES FOR RAPID PROCESSING AND COST SAVINGS | |
| HERE IS YOU LOWEST MONTHLY PAYMENT OPTION: $1,411.46 | |
| BASE INTEREST RATE | 7.375% |
| DOWN PAYMENT ADJUSTMENT | .220% |
| TOTAL INTEREST RATE ⟹ | 7.595% |
| PRINCIPAL AND INTEREST | $1,242.09 |
| PROPERTY TAX AND HOMEOWNERS INSURANCE | $169.38 |
| TOTAL MONTHLY PAYMENT ⟹ | $1,411.46 |
| NOTE: BECAUSE LOAN RATES CHANGE FREQUENTLY, THESE RATES ARE NOT GUARANTEED UNTIL YOU LOCK YOUR RATE. HOWEVER, IF YOU WOULD LIKE TO RESERVE YOUR RATE FOR 24 HOURS SAVE NOW. | |
| HOME LOAN DETAILS | |
| TOTAL COSTS | |
| PURCHASE PRICE | $200,000.00 |
| ESTIMATED CLOSING COSTS | $7,000.00 |
| POINTS(2.0 PTS.) | $4,000.00 |
| TOTAL ⟹ | $211,000.00 |
| SUBTRACT | |
| LOAN AMOUNT | $200,000.00 |
| APPLICATION FEE | $350.00 |
| SALES CONTRACT DEPOSIT | $0.00 |
| CLOSING COSTS PAID BY SELLER | $0.00 |
| ⟹ | $200,350.00 |
| CASH DUE AT CLOSING ON 04/30/2000 ⟹ | $10,650.00 |
| *YOUR APPROVAL IS SUBJECT TO THE ACCURACY OF THE DATA THAT YOU HAVE PROVIDED AND IS CONTINGENT UPON YOUR COMPLETING THE NEXT STEPS SHOWN ON MY PAGES. | |

( SAVE AND SHOW ME OTHER LOAN OPTIONS )   ( YES, I WANT THIS LOAN )

FIG. 2p

| FILE EDIT VIEW GO COMMUNICATOR HELP |

YOU'VE FOUND A HOME AND ARE READY TO BUY

▫ APPROVED* HOME LOANS FOR $200,000.00 LOAN AMOUNT

YOU HAVE BEEN APPROVED FOR THE FOLLOWING LOANS. IF YOU SEE THE LOAN YOU WANT, YOU MAY SELECT THE LOAN AND CONTINUE. IF YOU WOULD LIKE TO SEE A PARTICULAR LOAN IN MORE DETAIL, SELECT SHOW DETAILS. YOU MAY COMPARE ANY TWO LOANS SIDE-BY-SIDE BY CHECKING THE BOXES NEXT TO THE DESIRED LOANS AND SELECTING THE COMPARE BUTTON.

| 30 YEAR FIXED RATE | INTEREST RATE | PAYMENT | POINTS | APR | SELECT ANY TWO TO COMPARE |
|---|---|---|---|---|---|
| [SHOW DETAILS] [I WANT THIS LOAN] | 7.845% | $1,445.98 | $0.00 0 PTS | 7.955% | ☐ |
| [SHOW DETAILS] [I WANT THIS LOAN] | 7.720% | $1,428.68 | $2,000.00 1 PTS | 7.828% | ☐ |
| [SHOW DETAILS] [I WANT THIS LOAN] | 7.595% | $1,411.46 | $4,000.00 2 PTS | 7.701% | ☐ |

| 20 YEAR FIXED RATE | INTEREST RATE | PAYMENT | POINTS | APR | SELECT ANY TWO TO COMPARE |
|---|---|---|---|---|---|
| [SHOW DETAILS] [I WANT THIS LOAN] | 7.570% | $1,619.76 | $0.00 0 PTS | 7.676% | ☐ |
| [SHOW DETAILS] [I WANT THIS LOAN] | 7.445% | $1,604.47 | $2,000.00 1 PTS | 7.549% | ☐ |
| [SHOW DETAILS] [I WANT THIS LOAN] | 7.320% | $1,589.25 | $4,000.00 2 PTS | 7.422% | ☐ |

| 15 YEAR FIXED RATE | INTEREST RATE | PAYMENT | POINTS | APR | SELECT ANY TWO TO COMPARE |
|---|---|---|---|---|---|
| [SHOW DETAILS] [I WANT THIS LOAN] | 7.345% | $1,836.45 | $0.00 0 PTS | 7.448% | ☐ |
| [SHOW DETAILS] [I WANT THIS LOAN] | 7.220% | $1,822.35 | $2,000.00 1 PTS | 7.321% | ☐ |
| [SHOW DETAILS] [I WANT THIS LOAN] | 7.095% | $1,808.30 | $4,000.00 2 PTS | 7.194% | ☐ |

| 10 YEAR ADJUSTABLE RATE | INTEREST RATE | PAYMENT | POINTS | APR | SELECT ANY TWO TO |

FIG. 2q

CAPTURE PRODUCT SELECTION

FILE  EDIT  VIEW  GO  COMMUNICATOR  HELP

YOU'VE FOUND A HOME AND ARE READY TO BUY
■ COMPARE SELECTED LOANS

TO SEE A SIDE BY SIDE COMPARISON OF OTHER LOANS YOU ARE APPROVED FOR, SELECT THE LOAN TYPE, PAYMENT PREFERENCE, AND POINTS YOU PREFER.

| SUMMARY | LOAN OPTION 1 | LOAN OPTION 2 |
|---|---|---|
| LOAN TYPE | 3 YEAR ADJUSTABLE RATE | 7 YEAR BALLON |
| POINTS | (0 PTS) $0.00 | (1 PTS) $2,000.00 |
| INTEREST RATE | 6.715% | 7.465% |
| TOTAL MONTHLY PAYMENT | $1,292.55 | $1,393.64 |

| HOME LOAN DETAILS | | |
|---|---|---|
| TOTAL COSTS | | |
| PURCHASE PRICE | $200,000.00 | $200,000.00 |
| ESTIMATED CLOSING COSTS | $7,000.00 | $7,000.00 |
| POINTS | (0 PTS) $0.00 | (1 PTS) $2,000.00 |
| TOTAL | → $207,000.00 | → $209,000.00 |
| SUBTRACT | | |
| LOAN AMOUNT | $200,000.00 | $200,000.00 |
| APPLICATION FEE | $350.00 | $350.00 |
| SALES CONTRACT DEPOSIT | $0.00 | $0.00 |
| CASH PAID BY SELLER | $0.00 | $0.00 |
| TOTAL | → $200,350.00 | → $200,350.00 |

CASH DUE AT CLOSING ON 04/30/2000    → $6,650.00    → $8,650.00

(I WANT LOAN OPTION 1)    (I WANT LOAN OPTION 2)

FIG. 2r

CAPTURE PRODUCT SELECTION

FILE  EDIT  VIEW  GO  COMMUNICATOR  HELP

YOU'VE FOUND A HOME AND ARE READY TO BUY
■ YOU HAVE CHOSEN A 7 YEAR BALLOON HOME LOAN WITH AN INTEREST RATE OF 7.465%

LOAN SUMMARY
INTEREST RATIO: 7.465%                          TOTAL MONTHLY PAYMENT $1,393.64

COSTS
  PURCHASE PRICE              $200,000.00       SUBTRACT    LOAN AMOUNT  $200,000.00
  ESTIMATED CLOSING COSTS           %7,000.00               APPLICATION FEE    $350.00
  POINTS           (1.0 PTS.) $2,000.00                     SALES CONTRACT DEPOSIT   $0.00
                              209,000.00                    CLOSING COSTS PAID BY SELLER  $0.00
                                                                                  $200,350.00

CASH DUE AT CLOSING ON 04/30/2000
$8,650.00  [ESTIMATE OF CLOSING COSTS]

WANT TO SLEEP ON IT?
NOT TO WORRY! IF YOU WANT TO THINK THIS OVER OR DISCUSS IT WITH SOMEONE BEFORE YOU MAKE A COMMITMENT,
WE'LL RESERVE YOUR RATE FOR 24 HOURS. JUST CLICK THE "SAVE AND CONTINUE LATER" BUTTON BELOW, OR YOU
CAN PROCEED WITH YOUR APPLICATION BY FILLING IN THE INFORMATION BELOW AND CLICKING "SUBMIT".

APPLICATION FEE
IN ORDER TO COMPLETE YOUR HOME LOAN APPLICATION, A NONREFUNDABLE APPLICATION FEE OF $350 MUST BE PAID
VIA CREDIT CARD. THIS AMOUNT WILL COVER COSTS ASSOCIATED WITH PROCESSING YOUR LOAN. THE $350 APPLICATION
FEE WILL BE CREDITED TO THE AMOUNT OF CASH YOU ARE REQUIRED TO BRING TO CLOSING.

FULL NAME      [NAME AS IT APPEARS ON CREDIT CARD]
CREDIT CARD    [VISA ▼]
CARD NUMBER    [          ]
EXPIRATION DATE [  /  ]
               (MM,YY)

( SAVE AND CONTINUE LATER )                              ( SUBMIT THIS APPLICATION )

PROBABLE QUALIFICATION CALCULATOR

☐ STEP 1 OF 3: YOUR LIKELIHOOD OF HOME LOAN APPROVAL

ABOUT YOURSELF AND ANY CO-BORROWERS

YOUR ANSWERS SHOULD INCLUDE TOTAL COMBINED AMOUNTS
FOR YOURSELF AND ANY CO-BORROWERS

TYPE OF HOME LOAN  [PURCHASE ▼]

HOW MANY BORROWERS WILL BE ON THE HOME LOAN APPLICATION?   ⦿ ONE  ○ TWO

ANNUAL INCOME   $ [55,000]

ARE ANY OF THE BORROWERS SELF-EMPLOYED?   ○ YES  ⦿ NO

TOTAL MONTHLY DEBT PAYMENTS   $ [985]
NOT INCLUDING CURRENT HOME LOAN OR RENT PAYMENT.

CURRENT CASH VALUE OF ASSETS   $ [22,500]

◁ GO BACK     PROCEED TO STEP 2 ▷

FIG. 5

```
PROBABLE QUAL STEP 2 OF 3
FILE  EDIT  VIEW  GO  COMMUNICATOR    HELP
```

PROBABLE QUALIFICATION CALCULATOR
▫ STEP 2 OF 3: ABOUT THE HOME

IS THE PROPERTY A CONDOMINIUM?   ○ YES  ⊙ NO

I WILL USE THE HOME AS        [PRIMARY RESIDENCE ▼]

LOAN TYPE                    [30 YEAR FIXED RATE ▼]

PURCHASE PRICE               $ [168,500]

FUNDS FOR DOWNPAYMENT AND CLOSING   $ [19,000]

◁ GO BACK TO STEP 1              PROCEED TO STEP 3 ▷

FIG. 6

```
PROBABLE QUAL STEP 1 OF 3                                    _ □ ×
FILE  EDIT  VIEW  GO  COMMUNICATOR  HELP
```

PROBABLE QUALIFICATION CALCULATOR

□ STEP 1 OF 3: YOUR LIKELIHOOD OF HOME LOAN APPROVAL

ABOUT YOUR SELF AND ANY CO-BORROWERS

YOUR ANSWERS SHOULD INCLUDE TOTAL COMBINED AMOUNTS
FOR YOURSELF AND ANY CO-BORROWERS

TYPE OF HOME LOAN                                           [REFINANCE ▶]

HOW MANY BORROWERS WILL BE ON THE HOME LOAN APPLICATION?    ⊙ ONE  ○ TWO

ANNUAL INCOME                                               $ [ 55,000 ]

ARE ANY OF THE BORROWERS SELF-EMPLOYED?                     ○ YES  ⊙ NO

TOTAL MONTHLY DEBT PAYMENTS                                 $ [ 985 ]
NOT INCLUDING CURRENT HOME LOAN OR RENT PAYMENT.

CURRENT CASH VALUE OF ASSETS                                $ [ 22,500 ]

◁ GO BACK                                          PROCEED TO STEP 2 ▷

FIG. 7

PROBABLE QUAL STEP 2 OF 3
FILE  EDIT  VIEW  GO  COMMUNICATOR  HELP

PROBABLE QUALIFICATION CALCULATOR
☐ STEP 2 OF 3: ABOUT THE HOME

IS THE PROPERTY A CONDOMINIUM?     ○ YES  ⦿ NO

I WILL USE THE HOME AS              [PRIMARY RESIDENCE ▶]

LOAN TYPE                           [30 YEAR FIXED RATE ▶]

WHAT IS YOUR CURRENT MORTGAGE BALANCE?   $ [110,000]

WHAT IS THE CURRENT VALUE OF THE PROPERTY?   $ [168,500]

WHAT IS THE LOAN AMOUNT?            $ [118,000]

INTEREST RATE                       [8% ▶]

◁ GO BACK TO STEP 1        PROCEED TO STEP 3 ▷

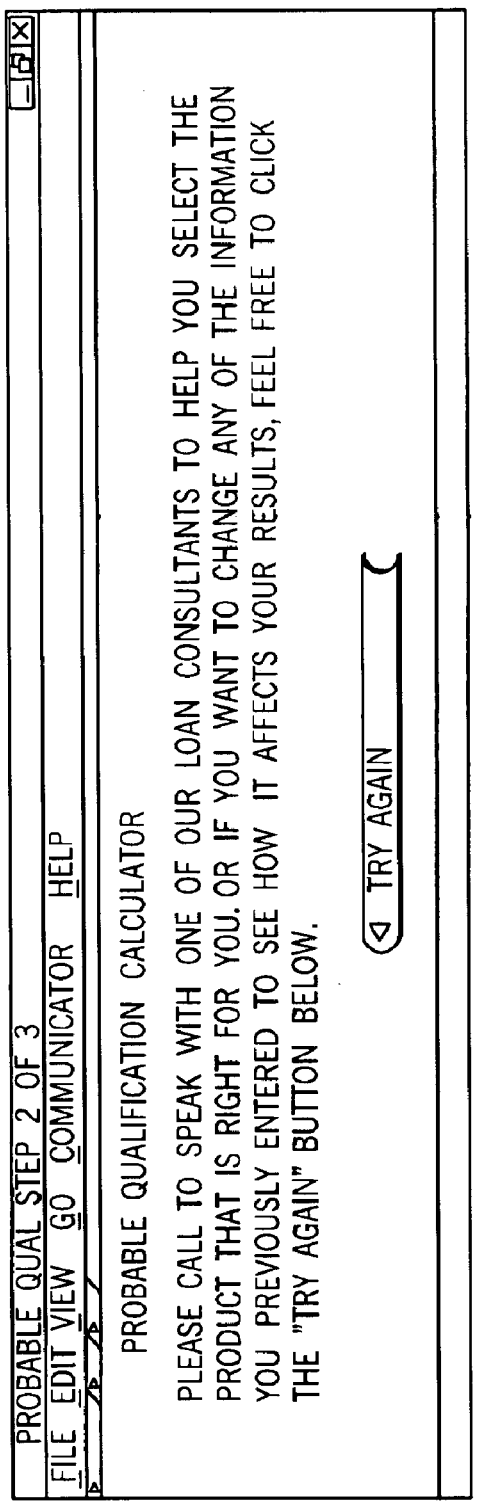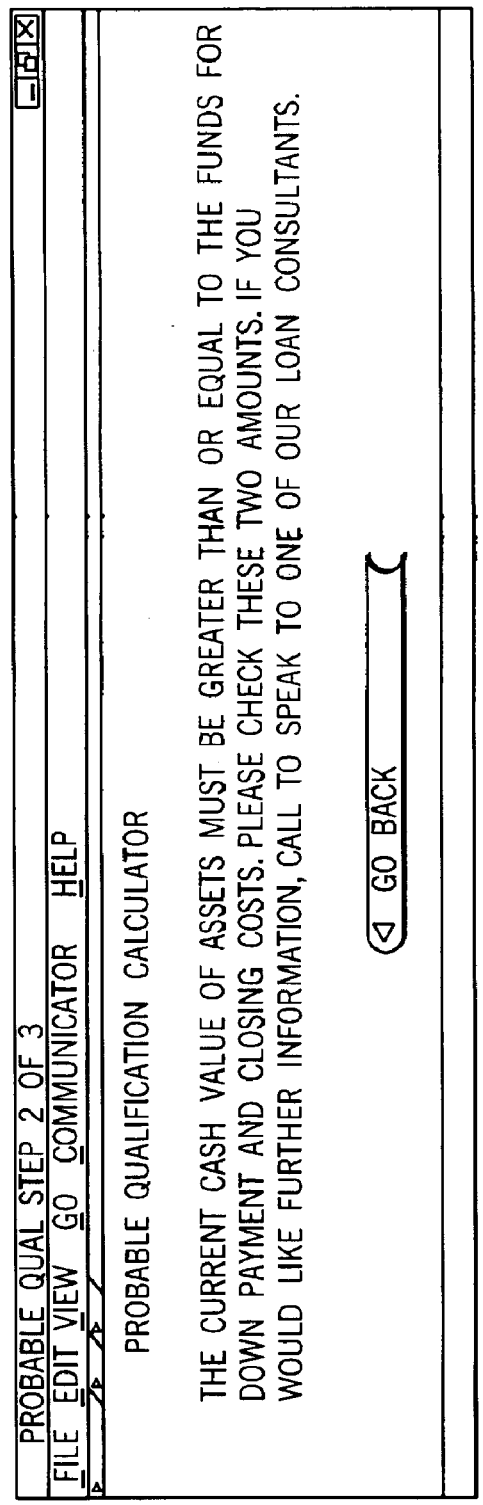
FIG. 8
FIG. 9

FIG. 10

PROBABLE QUAL STEP 3 OF 3 — □X
FILE  EDIT  VIEW  GO  COMMUNICATOR  HELP

PROBABLE QUALIFICATION CALCULATOR
□ STEP 3 OF 3: ABOUT YOUR USE OF PERSONAL CREDIT

WHAT IF I HAVE CREDIT PROBLEMS?
WE HAVE SPECIAL PROGRAMS FOR PEOPLE WITH LESS-THAN-PERFECT CREDIT. WE WILL WORK WITH YOU TO COME UP WITH RIGHT HOME LOAN SOLUTION TO MEET YOUR NEEDS. WHEN ANSWERING, THINK OF YOURSELF AND ANY CO-BORROWERS.

DURING THE PAST 10 YEARS HAVE YOU FILED FOR BANKRUPTCY, HAD A HOME FORECLOSED, HAD A TAX LIEN FILED AGAINST YOU, OR HAD YOUR INCOME GARNISHED BY A CREDITOR?   ○ YES  ● NO

WHEN DID YOU OPEN YOUR VERY FIRST CREDIT ACCOUNT?  [GREATER THAN 5 UP TO 10 YRS AGO ▼]

HOW MANY NEW CREDIT ACCOUNTS HAVE YOU OPENED IN THE PAST 2 YEARS?   ● FEWER THAN 5   ○ 5 OR MORE

WHEN WAS THE LAST TIME YOU WERE MORE THAN A MONTH LATE ON A CREDIT ACCOUNT PAYMENT?  [NEVER DELINQUENT ▼]

HOW MANY TIMES DURING THE LAST 7 YEARS HAVE YOU BEEN MORE THAN ONE MONTH LATE ON A CREDIT ACCOUNT PAYMENT?   [0 ▼]

WHAT IS THE APPROXIMATE TOTAL DOLLAR AMOUNT OF YOUR CURRENT BORROWING POWER? (I.E. SUM OF CREDIT LIMITS ON ALL CREDIT CARDS)   $ [10,001–20,000 ▼]

WHAT IS THE APPROXIMATE TOTAL DOLLAR AMOUNT OF MONEY YOU HAVE CURRENTLY BORROWED? THIS IS THE SUM OF ALL YOUR OUTSTANDING CREDIT CARD BALANCES.   $ [3,501–10,000 ▼]

◁ GO BACK TO STEP 2        SEE RESULTS △

FIG. 11

PROBABLE QUAL-RESULTS □■☒
FILE  EDIT  VIEW  GO  COMMUNICATOR  HELP

PROBABLE QUALIFICATION CALCULATOR

86% OF PEOPLE WHO ANSWERED THE QUESTIONS THE WAY YOU DID WERE APPROVED FOR HOME LOANS. SINCE THIS FREE ESTIMATION TOOL DOES NOT GUARANTY THAT YOU'LL BE APPROVED FOR A HOME LOAN, THE WAY TO FIND OUT FOR CERTAIN IS TO APPLY.

TO BEGIN THE ONLINE APPLICATION, CLICK THE "SAVE AND APPLY NOW" BUTTON BELOW.

IF YOU WANT TO CHANGE ANY OF THE INFORMATION YOU PREVIOUSLY ENTERED TO SEE HOW IT AFFECTS YOUR RESULTS, FEEL FREE TO CLICK THE "TRY AGAIN" BUTTON BELOW.

◁ TRY AGAIN        SAVE AND APPLY NOW ▷

FIG. 12

PROBABLE QUAL-RESULTS □■☒
FILE  EDIT  VIEW  GO  COMMUNICATOR  HELP  @eFAXSEND

PROBABLE QUALIFICATION CALCULATOR

THE MAJORITY OF PEOPLE WHO ANSWERED THE QUESTIONS THEY WAY YOU DID WERE APPROVED. SINCE THIS FREE ESTIMATION TOOL DOES NOT GUARANTY THAT YOU'LL BE APPROVED FOR A HOME LOAN, THE WAY TO FIND OUT FOR CERTAIN IS TO APPLY.

WE ALSO ENCOURAGE YOU TO CALL TO SPEAK TO ONE OF OUR LOAN CONSULTANTS.

IF YOU WANT TO CHANGE ANY OF THE INFORMATION YOU PREVIOUSLY ENTERED, FEEL FREE TO CLICK THE "TRY AGAIN" BUTTON BELOW

◁ TRY AGAIN        SAVE AND APPLY NOW ▷

COMPUTERIZED SYSTEMS AND METHODS FOR FACILITATING THE FLOW OF CAPITAL THROUGH THE HOUSING FINANCE INDUSTRY

CROSS REFERENCE TO RELATED PATENT APPLICATIONS

This application is a divisional of, and claims priority to U.S. patent application Ser. No. 09/593,106 filed on Jun. 13, 2000, which is incorporated by reference herein in its entirety.

BACKGROUND OF THE INVENTION

The present invention relates generally to computerized systems and methods for facilitating the flow of capital through the housing finance industry. More particularly, the present invention relates to computerized systems and methods that may be used in connection with one or more of mortgage qualification, application, approval, underwriting and pricing.

When considering the purchase or refinance of a home, potential home buyers consult mortgage lenders such as mortgage companies, savings and loans institutions, credit unions, state and local housing finance agencies or the like to obtain the funds necessary to purchase or refinance their homes. These lenders, who make (originate and fund) mortgage loans directly to home buyers, comprise the "primary mortgage market."

When a mortgage is made in the primary mortgage market, the lender has several options which include: (i) holding the loan as an investment in its portfolio; (ii) selling the loan to investors in the "secondary mortgage market" (which includes financial institutions, pension funds, insurance companies, securities dealers, and various other investors) to replenish its supply of funds; or (iii) packaging the loan with other loans and exchanging them for securities like mortgage backed securities which provide lenders with a liquid asset to hold or sell to the secondary market. By choosing to sell its mortgage loans to the secondary mortgage market, or by selling the mortgage backed securities, lenders get a new supply of funds to make more home mortgage loans, thereby assuring home buyers a continual supply of mortgage credit.

A secondary mortgage market purchaser finances the loans and mortgage backed securities it buys for its own mortgage portfolio by the sale of debt securities in the global capital markets. Working with investment banks, the purchaser sells its debt to both domestic and international investors such as central banks, pension funds, investment funds, commercial banks, and insurance companies.

In the housing finance industry, a need exists for new systems and methods to make the process of buying a home quicker, easier and less costly. Particularly, a need in the industry exists for a loan platform that would (i) enable non-traditional players to originate loans without having to build the requisite infrastructure, (ii) streamline the loan process to provide a positive consumer experience, (iii) lower the cost of the loan origination process and reduce the costs and uncertainty associated with managing credit risk, and (iv) create a competitive pricing structure where specific components of the costs and fees associated with the loan may, at the borrower's option, be aggregated or "bundled" with the loan principal.

Accordingly, it is desirable to provide a system and process which provide a potential borrower with (i) a meaningful and readily understandable, real time, anonymous assessment of the likelihood of being approved for a loan based on limited information provided by the potential borrower without the need to obtain a credit report or a collateral appraisal, (ii) an online, real time, firm underwriting decision on each loan product offered by the lender for which the borrower is eligible, regardless of whether or not the borrower has identified actual collateral (e.g., real property) for the loan, (iii) the opportunity to aggregate closing costs with the loan principal, (iv) an interest rate and points specific to the potential borrower based on the credit risk to the lender and secondary mortgage market purchaser posed by the borrower in connection with the loan products for which the borrower is eligible, (v) reduced loan fees and costs resulting from requiring only limited appraisal field work or no appraisal field work (or the waiver of certain processing steps based on the purpose of the transaction and the loan product types requested), as appropriate, and (vi) reduced documentation verification requirements. It is also desirable to provide systems and processes that minimize the uncertainty faced by the loan originator when dealing with the secondary mortgage market by providing the loan originator with the acquisition price it may expect to receive for an individual loan (not an aggregate of loans) in the secondary market from the secondary mortgage market purchaser. It is intended that all matter contained in the above description and shown in the accompanying drawings shall be interpreted as illustrative and not in a limiting sense.

SUMMARY OF THE INVENTION

In accordance with an embodiment, a system for determining an interest rate quote and points for a mortgage loan that are specific to a borrower includes input means for obtaining borrower and mortgage loan information, means for retrieving underwriting characteristics and means for calculating the interest rate quote and points based on the borrower and mortgage loan information and based on the underwriting characteristics. The means for calculating includes means for retrieving a required yield which reflects market conditions in a secondary mortgage market including being indicative of a price that can be obtained for the mortgage loan in the secondary mortgage market, means for determining an adjustment to the required yield associated with the mortgage loan based on credit risk posed by the borrower, the credit risk adjustment being determined as a function of at least a credit score, a loan-to-value ratio, and a mortgage loan purpose for the mortgage loan and the borrower and means for determining other adjustments to the required yield based on other parameters related to the mortgage loan and/or the borrower. The interest rate quote and points are calculated as a function of the required yield adjusted by the credit risk adjustment and the other adjustments.

In accordance with another embodiment, a system for determining an interest rate quote and points for a mortgage loan that are specific to a hypothetical borrower for presentation by a loan originator to at least one potential borrower includes input means for obtaining financial information representative of a hypothetical potential borrower based on preselected specifications of the loan originator, input means for obtaining loan information, means for retrieving underwriting characteristics and means for calculating the interest rate quote and points based on the hypothetical potential borrower and mortgage loan information and based on the underwriting characteristics. The means for calculating includes means for retrieving a required portfolio yield which reflects market conditions in a secondary mortgage market including being indicative of a price that can be obtained for the mortgage loan in the secondary mortgage market, means for determining an adjustment to the required yield associated with the mortgage loan based on credit risk posed by the hypothetical borrower, the credit risk adjustment being determined as a function of at least a credit score, a loan-to-value ratio, and a mortgage loan purpose for the mortgage loan and the hypothetical borrower and means for determining other adjustments to the required yield based on other parameters related to the mortgage loan and/or the hypothetical borrower. The interest rate quote and points are calculated as a function of the required yield adjusted by the credit risk adjustment and the other adjustments.

BRIEF DESCRIPTION OF THE DRAWINGS

For a fuller understanding, reference is had to the following description, taken in connection with the accompanying drawings, in which:

FIGS. 2b–2u depict exemplary computer display screens illustrating the process flow depicted in FIG. 2a;

FIGS. 4–13 depict exemplary computer display screens used in connection with the probable qualification calculation process according to an exemplary embodiment;

DETAILED DESCRIPTION OF THE PREFERRED EMBODIMENTS

System and processes are disclosed that provide potential borrowers with the means to first ascertain the likelihood that they will be eligible for a loan (e.g., a mortgage loan) in real time over a global computer network, such as, for example, the Internet, and to apply for, and perhaps obtain, a loan online. Although discussed herein in the context of mortgage loans, it should be understood that the systems and methods are not limited to mortgage loans, but have application with respect to other types of loans.

Figure 1:
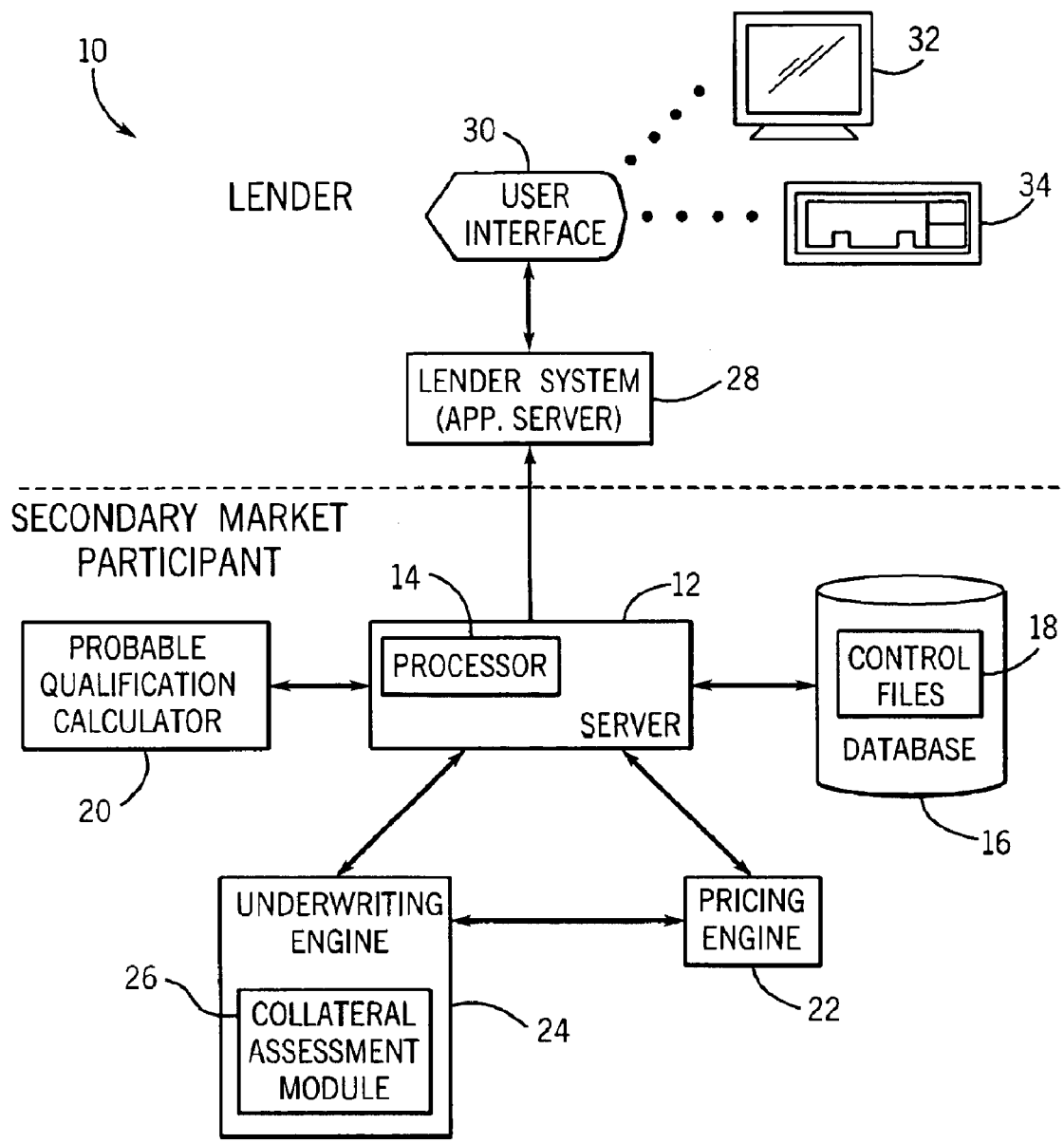
FIG. 1 is a schematic diagram of the system constructed and arranged according to an exemplary embodiment.

FIG. 1 depicts a simplified schematic illustration of a system, generally indicated at 10, which includes the component elements and means necessary to effect and control the various process steps as described hereinafter. Desirably, and where appropriate, system 10 utilizes existing computer capabilities, both hardware and software, and electronic communications links, for example, to display loan information to a potential borrower and to receive and process, in real time, data input by the potential borrower.

System 10 includes a computer server 12 which includes a processor 14. Server 12 has electronic access to a database 16 containing control files 18 also known as look up tables. Server 12 operates under the control of computer software to carry out the steps described in greater detail hereinafter. The computer software includes a probable qualification calculator 20, a pricing engine 22, an underwriting engine 24, and a collateral assessment module 26 within the underwriting engine, each a set of software objects and/or program elements collectively having the ability to execute independently in a separate thread or logical chain of process execution, while permitting the flow of data inputs therebetween. Calculator 20, engines 22 and 24, and module 26 can each be executed as a separate logical server or using a separate physical device. However, for lenders and potential borrowers, server 12 preferably operates as a single logical server.

Server 12 is electronically coupled to a remote server 28 on the lender side. Server 28 is coupled to a user interface 30 including conventional input and display devices 32 and 34, respectively. Interface 30 is preferably a remote interface coupled to server 28 via a publicly accessible global computer network. A common example of such a network is the Internet.

Users of system 10 include potential borrowers (e.g., home buyers), loan originators, which may be mortgage companies, savings and loans or other lending institutions. Desirably, the loan originators also include prospects in the mortgage lending business.

On a conceptual level, system 10 performs three functions: (i) identifying available loan products to potential borrowers, (ii) evaluating the loan application, and (iii) facilitating the sale of the mortgage loan to the secondary mortgage market purchaser. As described in greater detail hereinafter, the loan product identification function involves (a) calculating sample interest rates for presentation to potential borrowers to entice them to use system 10, as well as, (b) assessing a potential borrower's likelihood of being approved for a loan. The loan application evaluation function of system 10 involves underwriting and pricing the loan based on the potential borrower's specific financial profile and other relevant characteristics. The function of committing or selling the individual loan in the secondary mortgage market involves the determination of a spot price for presentation to the loan originator.

Although functionally distinct, it should be understood that the foregoing three functions preferably overlap when it comes to the flow of data inputs through system 10 in order to avoid requiring the borrower to enter the same core data more than once. For example, information input by the potential borrower and used by probable qualification calculator 20 as described in greater detail hereinafter can be used to populate the loan application and can be used by underwriting engine 24, pricing engine 22, and collateral assessment module 26 to effect their respective functions within system 10.

Figure 2A:
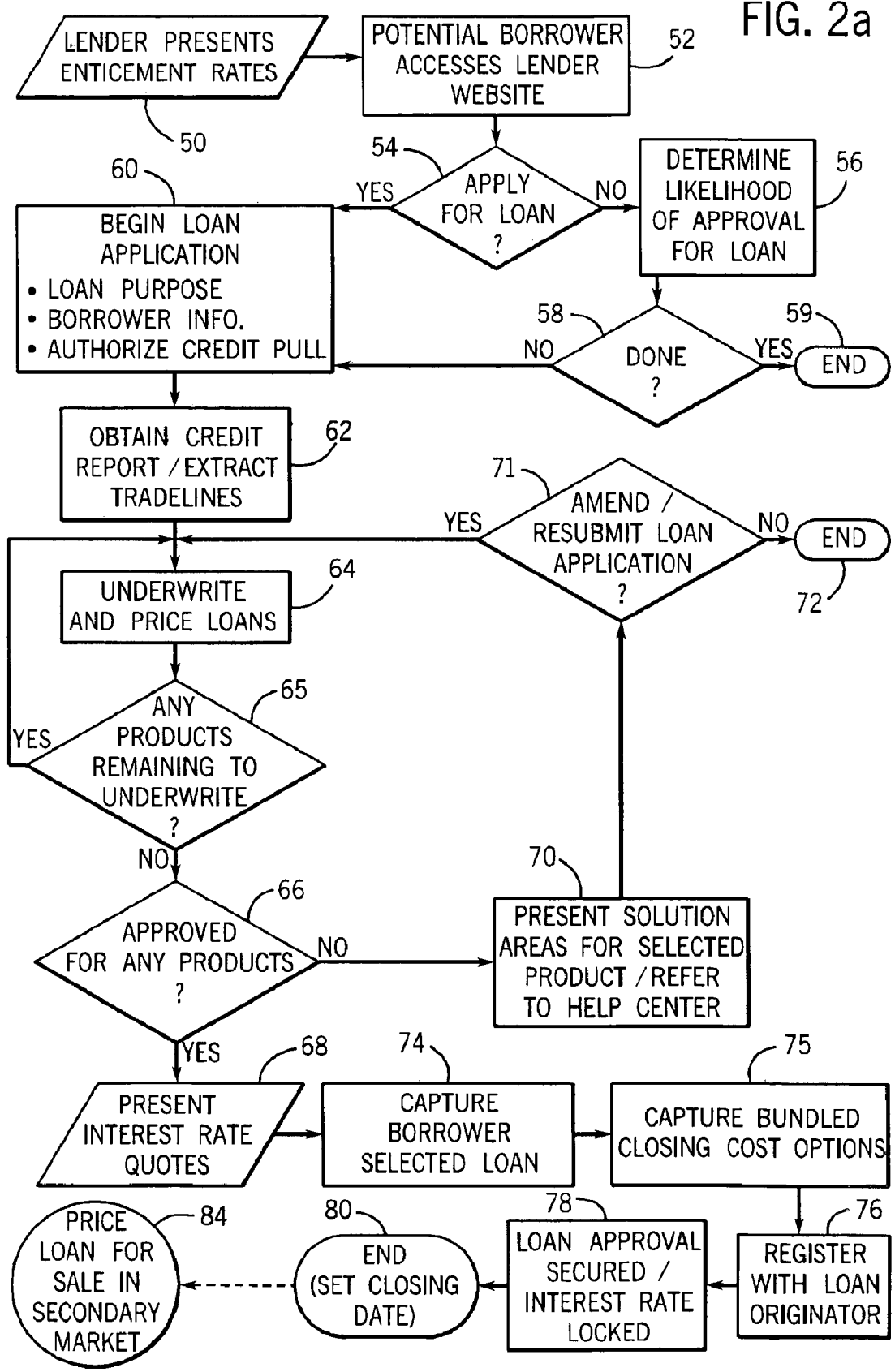
FIG. 2a is a high-level flow chart depicting the process flow according to an exemplary embodiment.
Figure 2B:
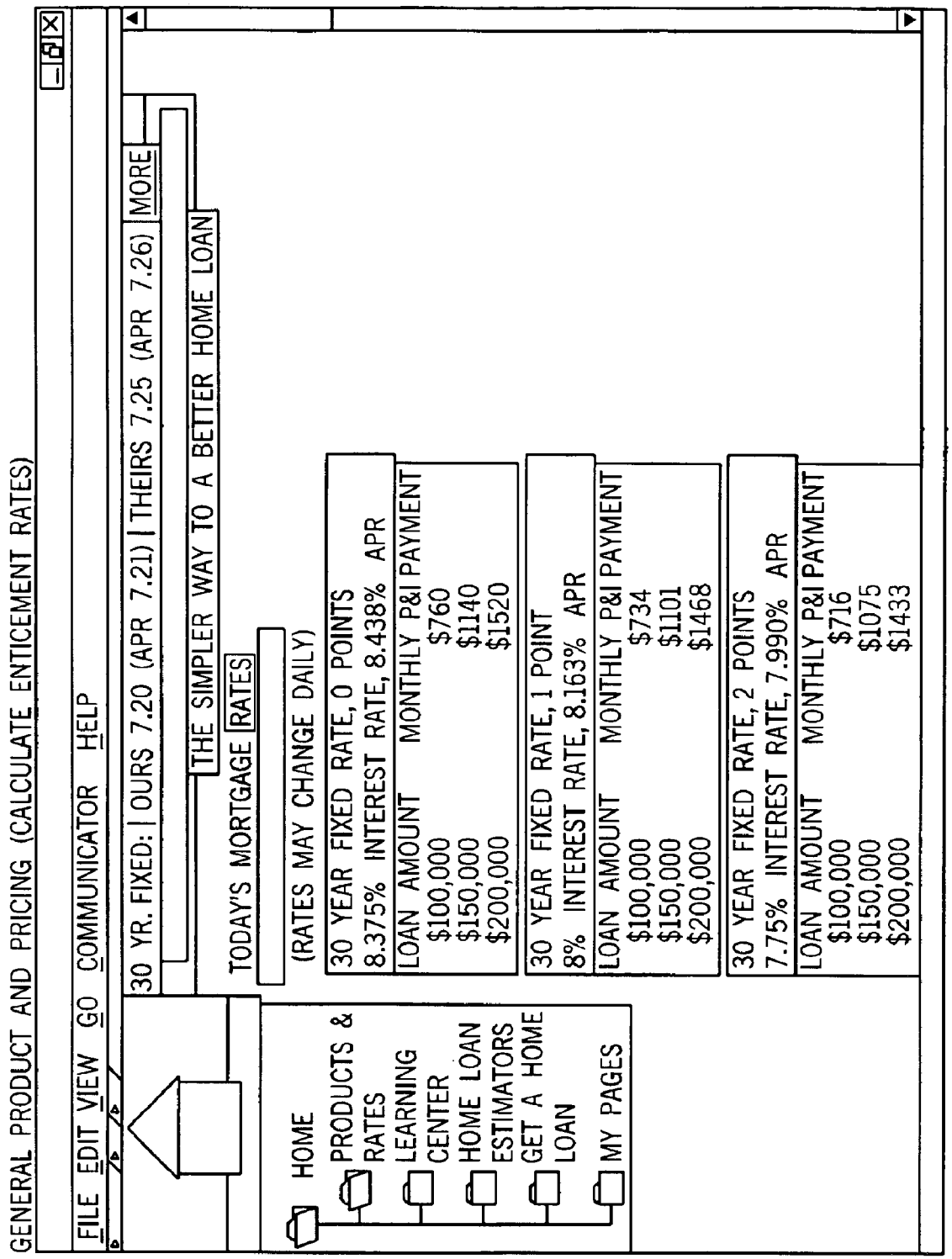
Figure 2D:
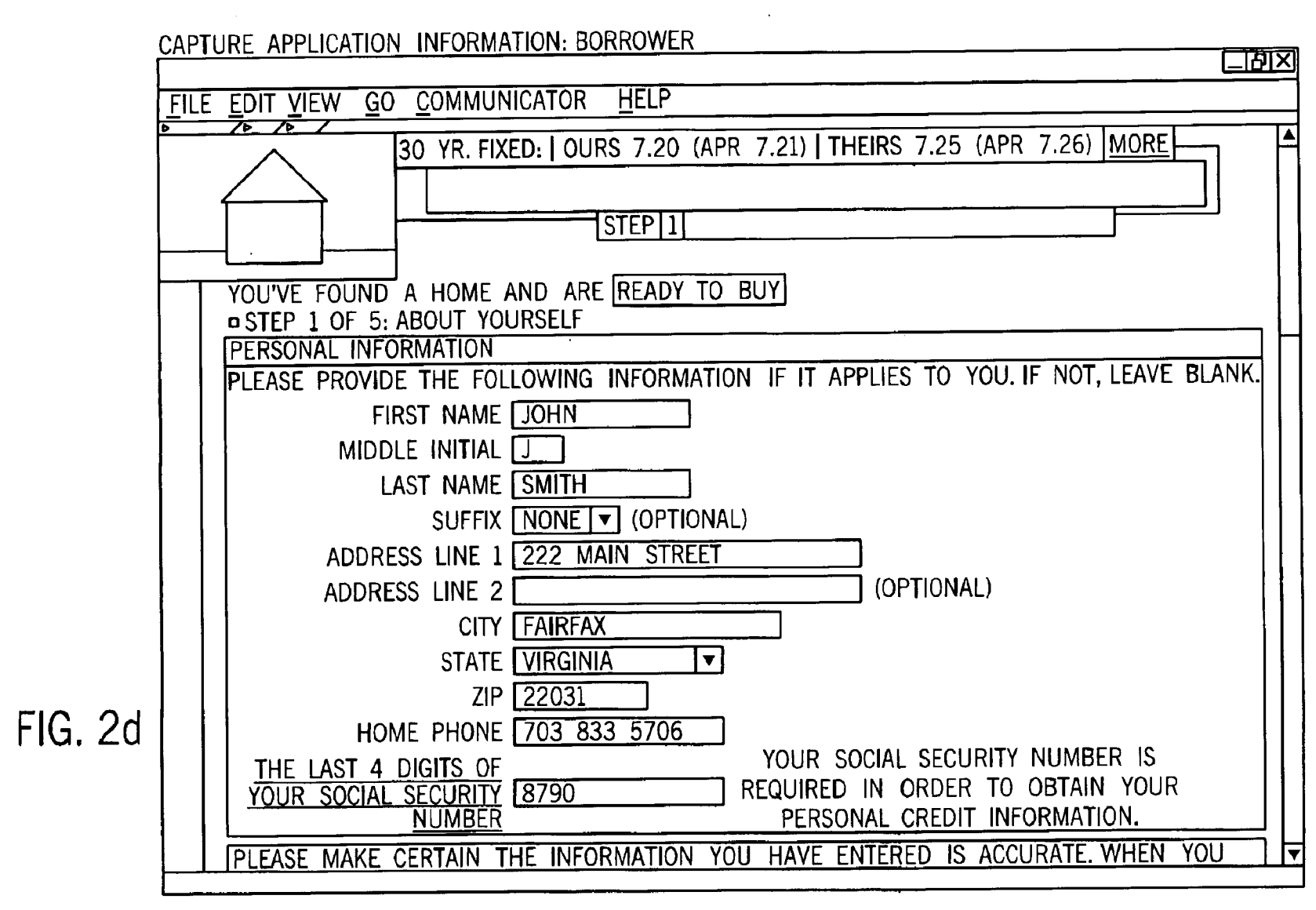
Figure 2J:
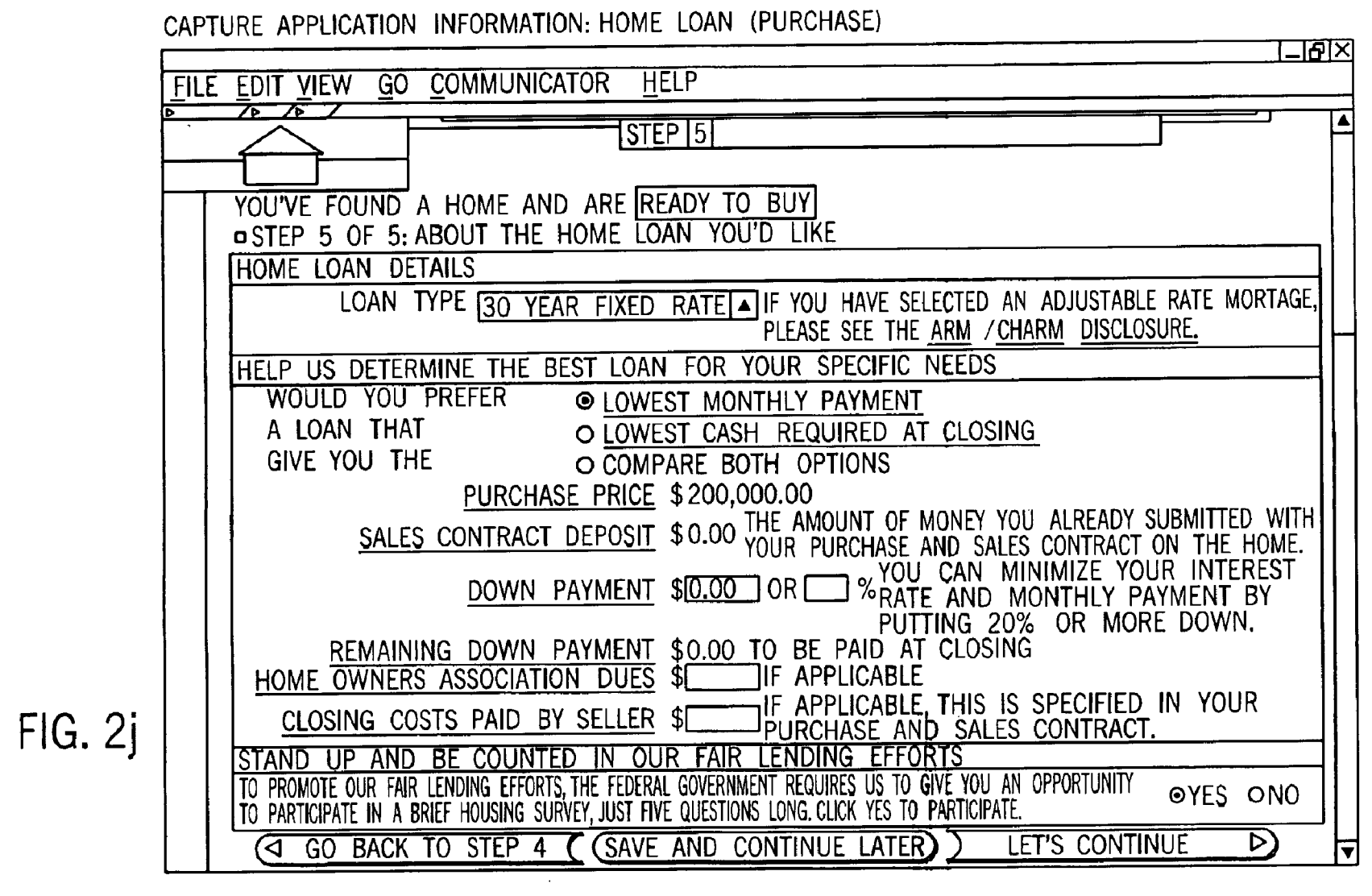
Figure 2K:
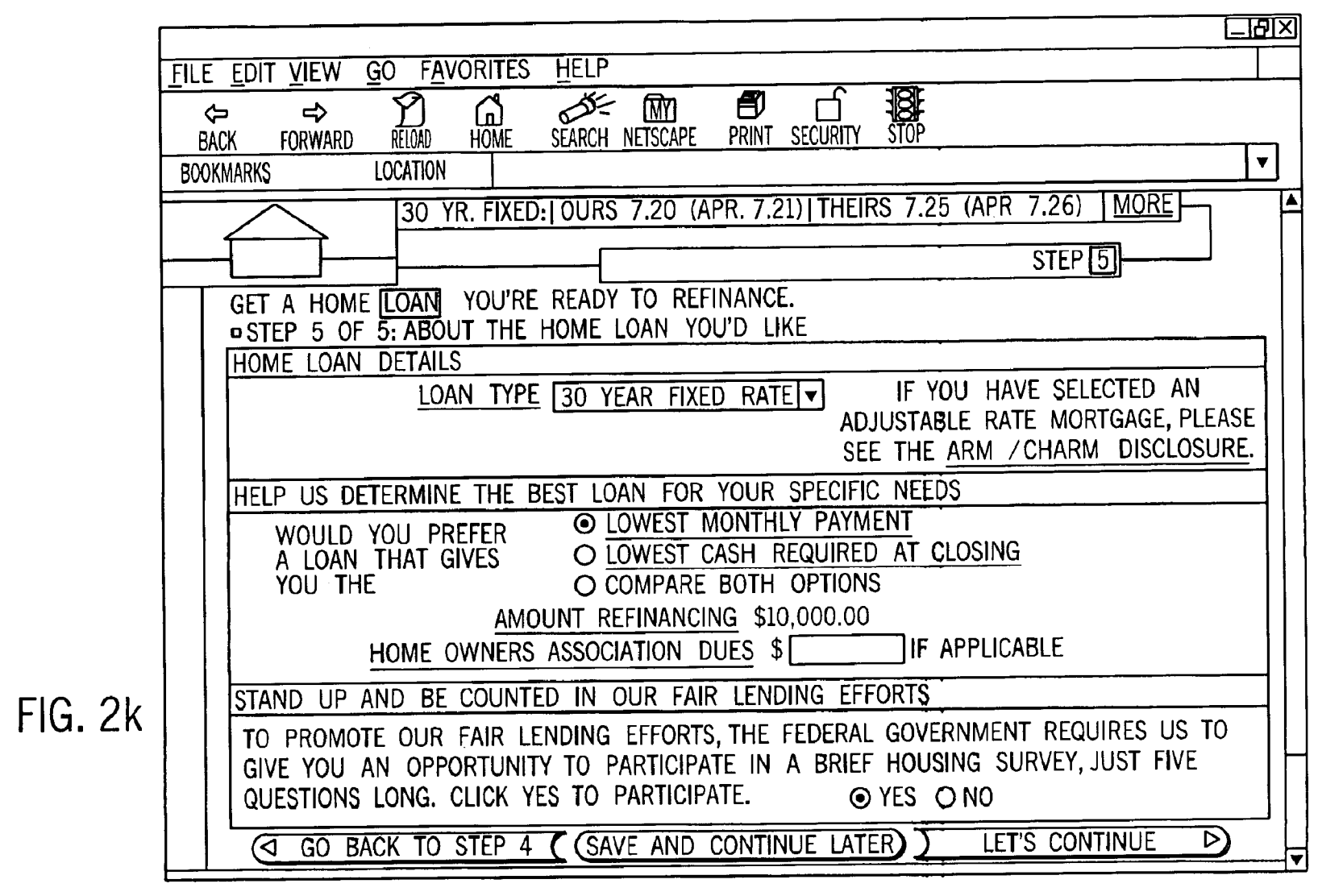
Figure 21:
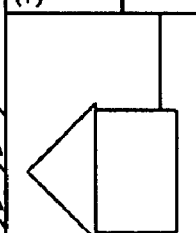

Referring now to FIG. 2a, the prospect or other loan originator preferably displays generic interest rates (together with an assumptive rate sheet, i.e., current mortgage rates) on its Internet web site or the like to entice online mortgage shoppers to access the web site (step 50). The generic interest rates ("enticement rates") displayed are not intended to be borrower specific, but are calculated by pricing engine 22 and provided to the loan originator as representative, for example, of interest rates that a "typical" borrower may expect to receive, or rates that a fictitious highly qualified borrower may expect to receive, as described in greater detail hereinafter. FIG. 2b depicts an example of a computer Internet interface screen displaying enticement rates.

Once enticed into accessing the loan originator's web site (step 52), the potential borrower is given the option of proceeding immediately with an online loan application or first determining his/her likelihood of being approved for a loan (decision 54). If the borrower opts to first ascertain the likelihood of being approved for a loan, system 10 preferably provides the potential borrower with an exploratory, self-assessment tool driven by probable qualification calculator software 20, as discussed in greater detail hereinafter.

Unlike conventional Internet mortgage web sites which offer housing affordability calculators, system 10 through its probable qualification calculator software 20 is designed to provide the potential borrower with an anonymous, risk-free and cost-free assessment of the percentage likelihood of approval for a mortgage loan (step 56). This is not a mere affordability calculation such as is common in conventional mortgage web sites. It should be understood, however, that probable qualification calculator 20 can be provided in tandem with a conventional affordability calculator.

Generally speaking, from the perspective of a potential borrower, there are distinct benefits associated with having probable qualification calculator 20 available for self-assessment purposes prior to undergoing a full online loan approval process. As discussed in greater detail hereinafter, calculator 20 can be utilized anonymously, because personal information about the borrower is not collected and a credit report from a credit reporting agency is not required to estimate the probability of mortgage loan approval. Also, the potential borrower can use calculator 20 without a specific property to evaluate. Furthermore, calculator 20 permits the borrower to compare the probability of approval for different loan "scenarios" by iteratively selecting different combinations of down payment, sales price, liquid assets, income, loan purpose, and mortgage product. Calculator 20 can be used without cost to the potential borrower since neither a credit report nor an appraisal is required for the estimation of an approval probability; rather, the borrower need only provide responses to a short online questionnaire which is designed to take only minutes to complete.

Once the potential borrower has ascertained the likelihood of being approved for a loan, the borrower may elect to terminate his/her online loan session or to proceed with an online loan application (decision 58). If the potential borrower does not wish to proceed with a loan application, the session ends (event 59).

If the potential borrower decides to proceed with a loan application (either at decision 54 or decision 58), system 10 captures the loan purpose (i.e., purchase or refinance) and other requested information input by the potential borrower including the borrower's and each co-borrower's name and social security number, address, employment, income, assets and current loans (step 60). In a preferred embodiment of the system and process, up to four (4) co-borrowers may be included on the loan application.

System 10 also assigns a unique identifier or casefile ID for the lender and loan application and requests authorization to obtain a credit report on the borrower. FIGS. 2c through 2o, depict examples of Internet display screens used to capture requisite information for the loan application process for both purchase and refinance loans, and to permit the potential borrower the opportunity to verify such information.

It should be understood that certain of the information for the loan application may be captured automatically from information already entered by the potential borrower in connection with the probable qualification process. This avoids the burden of having the potential borrower enter the same data more than once.

Preferably, system 10 automatically verifies information entered by the potential borrower concerning the address of the real property that is intended to underlie the loan being applied for ("address scrubbing"). As discussed in greater detail hereinafter, the verified address is preferably used to retrieve the statistical predicted value for available loans which is fed to collateral assessment module 26 during the underwriting process and is used to determine the requisite level of appraisal field work (i.e., waived, exterior-only inspection, or interior and exterior inspection). Also, system 10 preferably obtains the county in which the property is located as well as Metropolitan Statistical Area information for the address ("geocoding"). This information may be used to extract Department of Housing and Urban Development (HUD) median income information to help determine if the borrower could be eligible for alternative loan products. It should be understood that, by performing the address scrubbing and geocoding prior to the underwriting process described below, the actual underwriting and pricing of the loan will process faster.

With the permission of the potential borrower received, system 10 obtains a credit report on the borrower (step 62). Preferably, as discussed in greater detail hereinafter, the borrower's real estate tradelines (e.g., outstanding mortgages, home equity loans) are extracted from the credit report and provided to the loan originator. They are also displayed to the potential borrower for review and correction/explanation, if necessary.

With all the requisite credit and other information input, the loan application is submitted for underwriting and pricing (step 64), as described in greater detail hereinafter. Generally, underwriting engine 24 determines product eligibility based on preselected/preprogrammed rules. Underwriting engine 24 calls pricing engine 22 for the interest rate and point combination for each loan product.

The product affirmatively selected by the borrower (FIGS. 2j and 2k), is desirably underwritten first. Underwriting engine 24 will also underwrite the borrower for all available loan products (decision 65) and determine those products for which the borrower is approved (decision 66). The response to the loan originator is all of the approved products and their associated interest rate quotes (step 68, FIGS. 2p and 2q). It should be appreciated that this allows the borrower to review all of the information, compare loan products and interest rate quotes (e.g., side-by-side), and select the loan that best fits the borrower's needs (step 74, FIG. 2r).

Preferably, during underwriting, underwriting engine 24 also executes a process to determine for each approved product (i) the minimum amount of verification documentation required, (ii) the selected loan underwriting parameters (e.g., maximum loan amount, maximum loan amount for bundling closing costs and minimum refinance amount), and (iii) the maximums and minimums used to tailor the interest rate quote (maximum schedule interest rate and maximum number of points) and maximum interest rate approved for float up to a preselected increase over a current approved rate.

Additionally, during underwriting, underwriting engine 24 executes the collateral assessment module 26 to determine the required level of appraisal field work (i.e., waived, exterior-only property inspection, or interior and exterior property inspection). Preferably, collateral assessment module 26 will also compare the statistical predicted value retrieved earlier in the property assessment process against the purchase price or estimated appraisal value of the underlying real property. An appraisal will be waived if the purchase price or estimated appraisal value is accepted.

As described in greater detail hereinafter, in the event that the borrower is not approved for any loans, the loan originator is preferably provided with information from underwriting engine 24 identifying problem areas with respect to the borrower's application and suggested areas for improving the borrower's chances for approval (e.g., lower loan amount or reduce debt), and the borrower may be referred to a help center to receive the benefit of such information and suggestions (step 70). Additionally, the HUD median income information provided during the property assessment process may be used to determine if the borrower is eligible for other types of loan products. Also, in the event that no approved products are returned, the borrower is preferably given the opportunity to review, amend and resubmit the loan application (decision 71) prior to the end of the session on system 10 (step 72). If the borrower opts to amend the loan application, the process returns to step 64 and the amended loan application is re-submitted for underwriting and pricing.

Figure 2T:
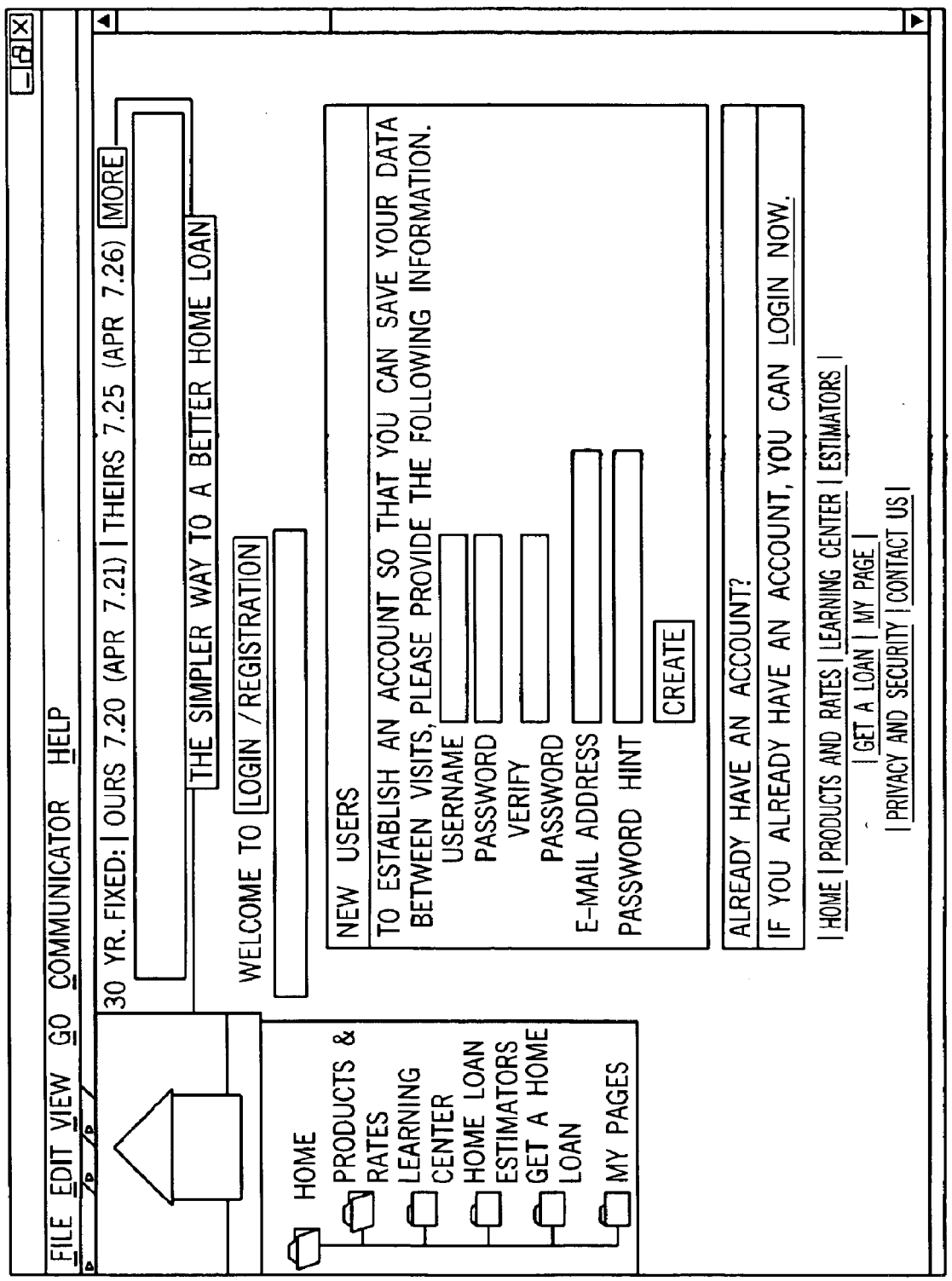

With the borrower approved and the selected loan captured by system 10 (step 74, FIG. 2s), the options for aggregating lender fees (i.e., the loan originator's actual out-of-pocket fees and expenses and a prorated portion of overhead expenses and reasonable profit associated with loan origination and closing) and core closing costs (i.e., all settlement and closing costs and fees including title search/ abstract costs, title examination fees, title insurance fees, etc.) with the loan principal are captured (step 75). The borrower is then asked to register with the prospect or loan originator (step 76, FIG. 2t). Registering with the prospect/ loan originator provides the borrower with the ability to (i) specify a lock option (e.g., float or lock) as described in greater detail below, (ii) check on loan status (e.g., documentation received?, appraisal completed, if required?, title search completed?). It should be understood that, if the borrower is floating, he/she can request a current "live" rate quote for the selected product at any time.

Figure 2U:
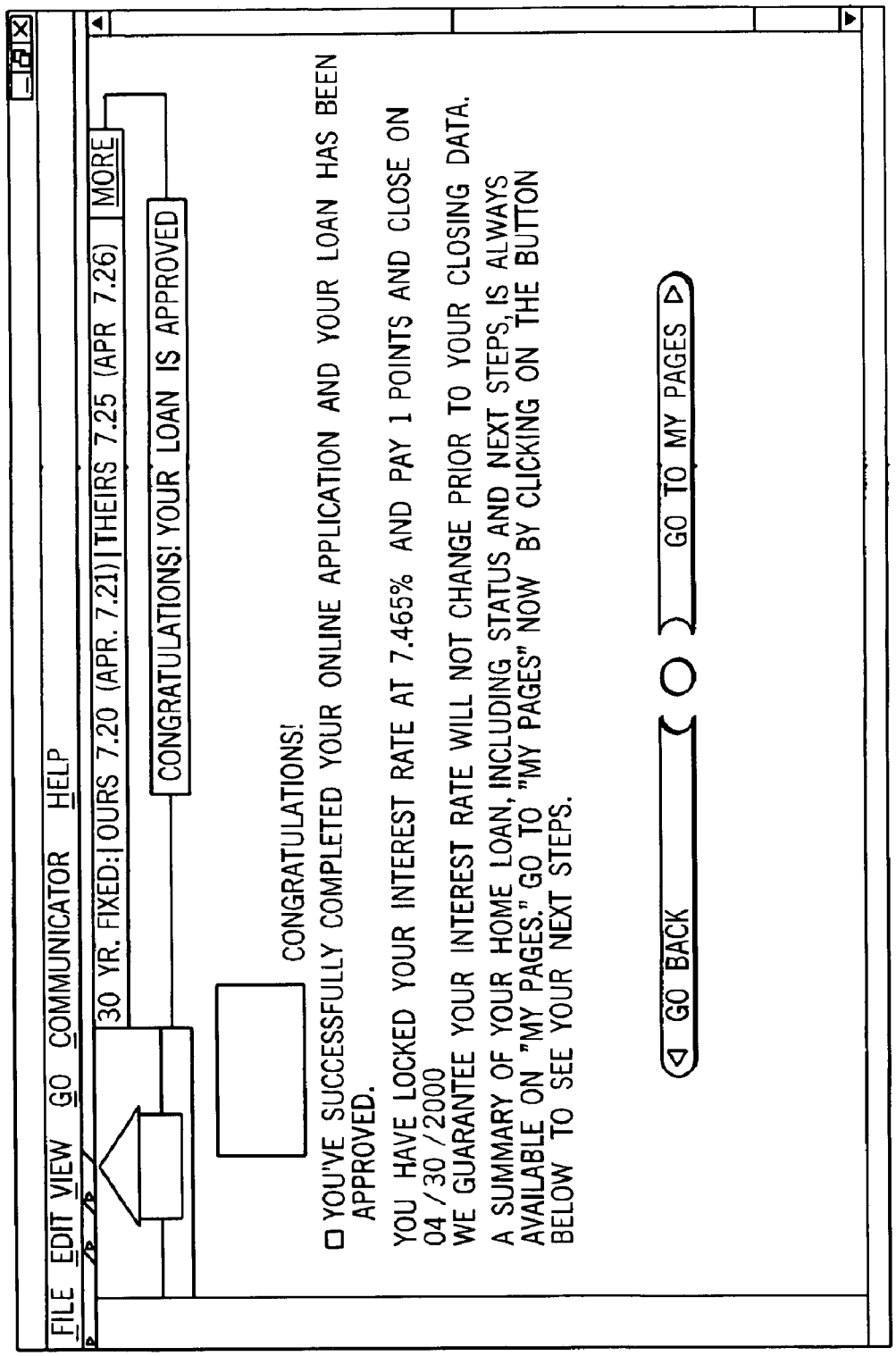

Once loan approval is secured and the interest rate is locked in (step 78), the loan qualification and application process is complete and a closing date is set (step 80). FIG. 2u depicts an exemplar of an Internet display screen congratulating the borrower on the successful completion of the online loan application.

Additionally, the loan originator may wish to sell the loan to a secondary mortgage market purchaser in the secondary market. Upon receiving a request to sell the individual loan, pricing engine 22 calculates a live ("spot") sales price for delivery to the loan originator in a manner described in greater detail hereinafter (step 84). It should be understood that the loan originator may initiate a request for a spot sales price for the loan in the system pipeline at any time after the loan has been rate locked in order to value the individual loan in the secondary mortgage market without selling the loan. However, the loan cannot be sold until it is closed.

Referring now to FIGS. 3 through 13, in a preferred embodiment, probable qualification calculator 20 carries out a four stage process to return a probable qualification assessment to a potential borrower. As discussed in greater detail below, the first stage of the process involves soliciting the potential borrower's responses to questions presented in an online questionnaire, and, based on initial responses, determining whether the borrower meets the eligibility requirements for the type of loan(s) being considered. With eligibility requirements satisfied, the second stage of the process involves translating the potential borrower's responses to the online questionnaire into a proxy credit score. The third stage involves assigning a statistical weight to the proxy credit score and assigning weights to responses entered concerning non-credit related loan characteristics. The values of all of the weights for the individual characteristic responses are then added together and converted into a probability. The fourth and final stage of the process involves mapping the calculated probability to an empirically determined range of underwriting approval rates.

Figure 3:
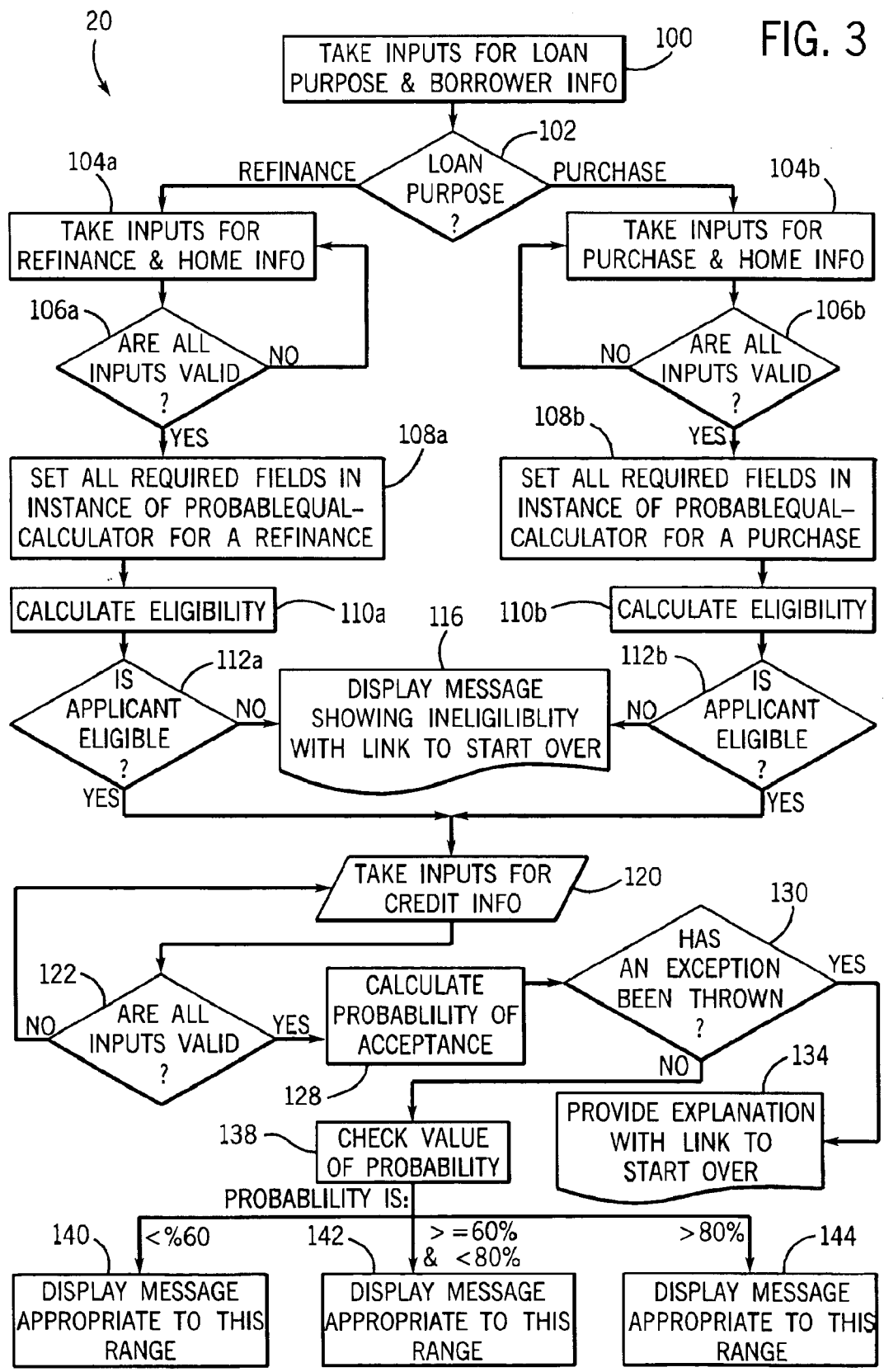
FIG. 3 is a flow chart depicting the probable qualification calculation process according to an exemplary embodiment.

Referring to FIG. 3, the potential borrower completes and submits to the loan originator an electronic or online questionnaire which requires the potential borrower to provide certain personal information as well as the purpose of the loan (step 100). Other information solicited in the questionnaire may include, but is not necessarily limited to, the property type (e.g., single family dwelling), the potential borrower's employment status (e.g., self-employed?), assets, annual income, monthly debt, and the number of times the potential borrower was late on credit over the previous several years. Preferably, several of the initial questions are used to determine whether the loan meets eligibility guidelines of the secondary mortgage market purchaser.

The questionnaire identifies loan factors and borrower characteristics that are used to provide an approval recommendation within existing underwriting schemes. Such factors are identified by employing statistical regression techniques applied to a historical sample of underwriting submissions with valid recommendations. Once the most influential factors are isolated and identified, the questionnaire is composed to capture this information from the potential borrower.

A representative sample of questions and formats requested for probable qualification calculator 20 in the online questionnaire is reproduced in Table 1 below.

TABLE 1

| Data Item | Field | Text for Field Description in Web Page | Data Format |
|---|---|---|---|
| 1 | Loan Purpose | Type of home loan | 1 = Purchase<br>2 = Refinance |
| 2a | Current Mortgage Balance | What is your current mortgage balance? | Dollar amount |
| 3b | Property Value | Purchase price | Dollar amount |
| 3a | Property Value | What is the current value of the property? | Dollar amount |
| 4b | Funds for Down Payment and Closing Costs | Funds for down payment and closing costs | Dollar amount |
| 4a | Loan Amount | What is the loan amount? | Dollar amount |
| 5 | Property Type | Is the property a Condominium? | 0 = No Condo<br>1 = Condo |
| 6 | Property Usage | I will use the home as . . . | 1 = Primary residence<br>2 = Second home |
| 7 | Loan Type | Loan type | 1 = 30 Year Fixed rate<br>2 = 15 Year Fixed rate<br>3 = Adjustable Rate Mortgage<br>4 = Balloon |

TABLE 1-continued

| Data Item | Field | Text for Field Description in Web Page | Data Format |
|---|---|---|---|
| 8 | Number of Borrowers | How many borrowers will be on the home loan application? | 1 = One<br>2 = Two |
| 9 | Self Employed | Are any of the borrowers self-employed? | 0 = No<br>1 = Yes |
| 10 | Liquid Assets | Current Cash Value of Assets | Dollar amount |
| 11 | Annual Income of all Borrowers Combined | Annual income | Dollar amount |
| 12 | Monthly Debt Payments | Total monthly debt payments not including current home loan or rent payment. | Dollar amount |
| 13 | Bankruptcies, foreclosures, tax liens or garnishments | During the past 10 years have you filed for bankruptcy, had a home foreclosed, had a tax lien filed against you, or had your income garnished by a creditor? | 0 = No<br>1 = Yes |
| 14 | First Credit Account | When did you open your very first credit account? | 1 = Less than 1 year ago<br>2 = From 1 up to 2 years ago<br>3 = Greater than 2 up to 5 years ago<br>4 = Greater than 5 up to 10 yrs ago<br>5 = More than 10 years ago |
| 15 | Credit Accounts | How many new credit accounts have you opened in the past 2 years? | 1 = Fewer than 5<br>2 = 5 or more |
| 16 | Late on Credit | When was the last time you were more than a month late on a credit account payment? | 1 = Never delinquent<br>2 = less than 1 year ago<br>3 = From 1 up to 3 years ago<br>4 = Greater than 3 up to 7 yrs ago<br>5 = More than 7 years ago |
| 17 | Number of Times late on credit | How many times during the last 7 years have you been more than one month late on a credit account payment? | 0 = 0<br>1 = 1<br>2 = 2<br>3 = 3<br>4 = 4<br>5 = 5 or more |
| 18 | Credit Limits | What is the approximate total dollar amount of your current borrowing power? (i.e. sum of credit limits on all credit cards) | 0–10,000<br>10,001–20,000<br>20,001–30,000<br>30,001–50,000<br>over 50,000 |
| 19 | Credit Utilization | What is the approximate total dollar amount of money you have currently borrowed? This is the sum of all your outstanding credit card balances. | 0–1,000<br>1,001–3,500<br>3,501–10,000<br>10,001–20,000<br>over 20,000 |
| 20 | Interest Rate | Interest Rate | Range of 5% to 10% in 25 basis point increments |

With the potential borrower's initial information and loan purpose input, the process proceeds to decision 102 which queries whether the loan purpose is a purchase or a refinance. If the loan purpose is a refinance, the potential borrower is prompted to enter refinance and home information (step 104a); if the loan purpose is a purchase, the borrower is prompted to enter purchase and home information (step 104b). As shown in Table 1, the questions differ depending on the loan purpose, i.e., purchase or refinance (data item 1). For example, referring to Table 1, if the loan is a purchase, data items 3b and 4b should be presented to the potential borrower. If the loan is a refinance, data items 2a, 3a, and 4a should be presented.

Prior to the completion of the data entry, data inputs are checked for validity for both refinance or purchase loans (steps 106a,b). For example, the amount entered in response to system 10's request for the current cash value of the potential borrower's assets (data item 10 in Table 1) must be equal to or greater than the amount entered for funds for down payment and closing costs (data item 4b). When the potential borrower enters a value for the current cash value of assets, system 10 checks it against the amount for down payment and closing costs. If the current value of assets is insufficient, a message along the lines of the following message is preferably displayed to the potential borrower:

"The current cash value of assets must be greater than or equal to the funds for down payment and closing costs. Please check these two amounts."

Thus, if all inputs are not valid, the process revisits steps 104a,b. If all inputs are valid, the process moves to steps 108a,b and sets the loan purpose as either refinance (step 108a) or purchase (step 108b), as appropriate.

With the loan purpose set as either refinance (step 108a) or purchase (step 108b), and prior to the completion of the data input, system 10 determines whether or not the loan meets preselected eligibility requirements of the secondary mortgage market purchaser (steps 110a,b, 112a,b). This is accomplished by using the first several responsive data inputs to the online questionnaire to compare product, purpose, occupancy, and calculated loan-to-value ratio ("LTV") to the secondary mortgage market purchaser's preselected underwriting guidelines which are retrievably stored in system database 16. LTV is preferably derived as follows:

LTV when loan purpose is purchase=1−(down payment amount/purchase price)

LTV when loan purpose is refinance=loan amount/property value

A loan may be designated ineligible under preselected underwriting guidelines for one of two reasons. The first reason is that the product, purpose, and occupancy selected are ineligible. The second reason is that the maximum LTV for the specific product, purpose and occupancy selected is restricted. The guidelines depicted in Table 2 below list representative maximum LTV's for each product, purpose, and occupancy type that fall within the scope of preselected requirements.

TABLE 2

| Product | Purpose | Occupancy | LTV % |
|---|---|---|---|
| Fixed Rate | Purchase | Primary Residence | 97.00 |
|  |  | Second Home | 95.00 |
|  | Refinance | Primary Residence | 90.00 |
|  |  | Second Home | 90.00 |
| ARM | Purchase | Primary Residence | 95.00 |
|  |  | Second Home | 95.00 |
|  | Refinance | Primary Residence | 90.00 |
|  |  | Second Home | 90.00 |
| Balloon | Purchase | Primary Residence | 95.00 |
|  |  | Second Home | 95.00 |
|  | Refinance | Primary Residence | 90.00 |
|  |  | Second Home | 90.00 |

If the potential borrower enters a combination of factors that is ineligible, the borrower is notified immediately of the ineligibility and is prompted to either change the selection or call a help center for assistance (action 116). It should be understood that this allows the potential borrower to change the response to a previous question and then continue on with the probable qualification process. If the potential borrower passes the eligibility screening, the borrower then is permitted to continue on with the probable qualification assessment and receives no eligibility feedback.

Referring now to FIG. 3, system 10 accepts credit related information inputs concerning the potential borrower (step 120). As with previous information inputs, the credit information inputs are checked for validity (decision 122). If inputs are not valid, the process revisits step 120. If all inputs are valid, the process continues to step 128.

At step 128, the borrower information submitted is evaluated in real time and calculator 20 calculates (before an actual loan application is submitted) the probability that the potential borrower will be approved for a loan. It should be appreciated that, contrary to common practice, this prequalification process is accomplished without the need to obtain a credit report on the potential borrower. Rather, as described in greater detail below, the potential borrower's responses to the questionnaire are translated by computer software into a "proxy" credit score, statistical weights are assigned to the loan characteristics, and the result is then converted into the probability of obtaining a loan approval.

Since a credit report is not obtained, a credit score is approximated by calculator 20 based on the potential borrower's responses to the questions seeking information regarding payment history and history of credit problems, such as bankruptcy, foreclosures, tax liens, or garnishments (data item 13). Preferably, a proxy credit score is calculated differently for potential borrowers who have indicated in their response to the credit questions that they have been late on a credit payment in the recent past (for example, within the previous 7 years) and those who did not.

For borrowers without a history of credit delinquency, the proxy credit score is preferably calculated as follows:

Proxy Credit Score (w/out delinquencies)=578 +weight for credit utilization+weight for number of accounts+weight for age of credit history+weight for public records For borrowers with a history of credit delinquency, the proxy credit score is preferably calculated as follows:

Proxy Credit Score (with delinquencies)=525 +weight for credit utilization and age of delinquency+weight for number of accounts+weight for age of credit history+weight for public records Using data obtained from the borrower questionnaire, the credit utilization ratio (the desired percentage of credit utilized) is preferably calculated as the dollar amount of credit used/dollar amount of total credit limit.

$$\text{Percentage of Credit Used} = \frac{\text{Dollar Amount of Credit Balances}}{\text{Dollar Amount of Total Credit Limits}}$$

The options presented to the potential borrower by system 10 for the dollar amount of credit utilized are preferably:

$0–$1,000
$1,001–$3,500
$3,501–$10,000
$10,001–$20,000
over $20,000

While the current options presented to the potential borrower by system 10 for the dollar amount of total credit limits are preferably:

$0–$10,000
$10,001–$20,000
$20,001–$30,000
$30,001–$50,000
over $50,000

Example 1

If the potential borrower selects the range "$1,001–$3,500" for credit utilized, and "over $50,000" for credit limit, the % of credit used calculation would be as follows:

$$\text{Percentage of Credit Used} = \frac{(3500 - 1001)/2 + 1001}{50000} 1 = 44.5\%$$

Example 2

If the potential borrower selects the range "$3,501–$10,000" for credit utilized, and "$0–$10,000" for credit limit, the % of credit used calculation would be as follows:

$$\text{Percentage of Credit Used} = \frac{(10000 - 3501)/2 + 3501}{(10000 - 0)/2 + 0} \frac{6}{5} = 1135\%$$

The primary difference in calculating a proxy credit score for the group consisting of those who have had a delinquency, as opposed to the group consisting of those without delinquencies, is that information concerning any delinquency is combined with a credit utilization ratio to determine a component of the proxy credit score. Also, the range of proxy credit scores is lower for this group (525–753) than it is for those without delinquencies (578–781).

The foregoing weights by attribute or characteristic preferably reside in look up tables in the system 10 database. Examples of look up tables for proxy credit scores with and without delinquencies are reproduced in Tables 3 and 4 below.

TABLE 3

Proxy Credit Score Attribute Weights for Applicants Without Delinquencies

| Characteristic | Attribute | Proxy Credit Score Points | Maximum Score | Minimum Score |
|---|---|---|---|---|
| Base Score/Intercept | | 578 | 578 | 578 |
| Utilization (Percentage of revolving Credit that is utilized) | 80 < utilization % | 0 | | 0 |
| | 40 < utilization % <= 80 | 19 | | |
| | 20 < utilization % <= 40 | 38 | | |
| | 10 < utilization % <= 20 | 54 | | |
| | Utilization % <= 10 | 75 | 75 | |
| How many accounts have Been established in last 2 years | Number accts. => 5 | 0 | | 0 |
| | Number accts. < 5 | 23 | 23 | |
| Age of credit history | Years < 2 | 0 | | 0 |
| | 2 <= years < 5 | 18 | | |
| | 5 <= years < 10 | 34 | | |
| | 10 <= years | 52 | 52 | |
| Public Record (Bankruptcies, foreclosures, tax liens, garnishments) | Yes | 0 | | 0 |
| | No | 53 | 53 | |
| Proxy Score = sum of points | | | 781 | 578 |

TABLE 4

Proxy Credit Score Attribute Weights for Applicants With Delinquencies

| Characteristic | Attribute | | Proxy Credit Score Points | Maximum Score | Minimum Score |
|---|---|---|---|---|---|
| Base Score/Intercept | | | 525 | 525 | 525 |
| Utilization | 80 < utilization % | | | | |
| (Percentage of | | delq. < 1 yr | 0 | | 0 |
| revolving | | 1 yr <= delq. < 3 yrs | 39 | | |
| Credit that is utilized) | | 3 yrs <= delq. < 7 yrs | 54 | | |
| and Recency of | 40 < utilization % <= 80 | | | | |
| Delinquency | | delq. < 1 yr | 19 | | |
| | | 1 yr <= delq. < 3 yrs | 56 | | |
| | | 3 yrs <= delq. < 7 yrs | 68 | | |
| | 20 < utilization % <= 40 | | | | |
| | | delq. < 1 yr | 42 | | |
| | | 1 yr <= delq. < 3 yrs | 79 | | |
| | | 3 yrs <= delq. < 7 yrs | 90 | | |
| | 10 < utilization % <= 20 | | | | |
| | | delq. < 1 yr | 59 | | |
| | | 1 yr <= delq. < 3 yrs | 97 | | |
| | | 3 yrs <= delq. <7 yrs | 108 | | |
| | Utilization % <= 10 | | | | |
| | | delq. < 1 yr | 78 | | |
| | | 1 yr <= delq. < 3 yrs | 115 | | |
| | | 3yrs <= delq. < 7 yrs | 127 | 127 | |
| How many accounts | Number accts. => 5 | | 0 | | 0 |
| have been established in | Number accts. < 5 | | 16 | 16 | |
| last 2 years | | | | | |
| Age of credit history | Years < 2 | | 0 | | 0 |
| | 2 <= years < 5 | | 26 | | |
| | 5 <= years < 10 | | 43 | | |
| | 10 <= years | | 57 | 57 | |
| Public Record | Yes | | 0 | | 0 |
| (Bankruptcies, | No | | 28 | 28 | |
| foreclosures tax liens, | | | | | |
| garnishments) | | | | | |
| Proxy Score = sum of points | | | | 753 | 525 |

Like LTV discussed above, weights may also be derived from the data entered by the potential borrower in response to the questions posed in the questionnaire. For example, monthly payment amount may be derived as follows given that the potential borrower enters the loan amount to be borrowed, the interest rate and the term of the loan.

Monthly payment=(Loan Amount/(1−1/(1+Monthly Interest Rate)$^{Term\ In\ Months}$))/Monthly Interest Rate)

where Monthly Interest Rate=(1 +Annual Interest Rate)$^{1/12}$−1

If the purpose of the loan is to refinance, the potential borrower provides the loan amount. If however, the purpose of the loan is a purchase, the loan amount is calculated as follows:

Loan Amount=home purchase price−down payment

It should be understood that the down payment value used is the one extracted from the borrower's input for funds available for down payment and closing costs and not the raw value provided for funds available, which includes both down payment and closing items.

Table 5 below is a chart showing model weights assigned to certain borrower characteristics.

TABLE 5

| | | | Range of Outcomes | |
|---|---|---|---|---|
| Characteristic | Attribute | Weight | High Boundary | Low Boundary |
| Base Probability/Intercept | | −7.4505 | −7.4505 | |
| Proxy Credit Score | 741+ | 0 | 0 | |
| | 720 <= 740 | 0.2252 | | |
| | 700 <= 720 | 0.873 | | |
| | 680 <= 700 | 1.5279 | | |
| | 660 <= 680 | 2.0891 | | |
| | 640 <= 660 | 2.5864 | | |
| | 620 <= 640 | 3.0853 | | |
| | 600 <= 620 | 3.4438 | | |
| | 580 <= 600 | 3.7109 | | |
| | 560 <= 580 | 3.9171 | | |
| | 540 <= 560 | 4.0484 | | |

TABLE 5-continued

|  |  |  | Range of Outcomes | |
|---|---|---|---|---|
| Characteristic | Attribute | Weight | High Boundary | Low Boundary |
|  | <=540 | 4.0452 |  | 4.0452 |
| Combined LTV | <=70 | 0 | 0 |  |
|  | 70 <= 80 | 0.8801 |  |  |
|  | 80 <= 90 | 2.3162 |  |  |
|  | 90 <= 97 | 2.8347 |  | 2.8347 |
| Back Ratio | <=20 | 0 | 0 |  |
|  | 20 <= 31 | 0.3557 |  |  |
|  | 31 <= 36 | 0.511 |  |  |
|  | 36 <= 45 | 0.6244 |  |  |
|  | 46+ | 1.129 |  | 1.129 |
| (Liquid Assets - | 10001+ | 0 | 0 |  |
| Down payment) | 5000 <= 10000 | 0.4349 |  |  |
|  | 3000 <= 5000 | 0.7601 |  |  |
|  | 2000 <= 3000 | 1.0667 |  |  |
|  | 1000 <= 2000 | 1.4492 |  |  |
|  | 1 <= 1000 | 2.1364 |  |  |
|  | 0 | 3.3219 |  | 3.3219 |
| Term of Loan | Term <= 15 yrs | 0 | 0 |  |
|  | 15 < Term <= 25 yrs | 0.8115 |  |  |
|  | Term > 25 yrs | 1.1472 |  | 1.1472 |
| Self Employed | No | 0 | 0 |  |
|  | Yes | 1.0178 |  | 1.0178 |
| Two or More Borrowers | No | 0 |  | 0 |
|  | Yes | -0.6865 | -0.6865 |  |
| Amortization Type | Fixed Rate Mortgage | 0 | 0 |  |
|  | Balloon Mortgage | 0 |  |  |
|  | Adjustable Rate Mortgage | 0.6609 |  | 0.6609 |
| Occupancy Status | Owner Occupied | 0.0167 | 0.0167 |  |
|  | Second Home | 0.1324 |  |  |
|  | Investor Property | 0 |  | 0 |
| Number of Units | 1-2 | 0 | 0 |  |
|  | 3-4 | 0.0664 |  | 0.0664 |
| Condo | No | 0 | 0 |  |
|  | Yes | 0.1058 |  | 0.1058 |
| Derogatory Record | No | 0 | 0 |  |
|  | Yes | 0.8902 |  | 0.8902 |
| Loan Purpose | Purchase (money mortgage) | 0.3416 |  |  |
|  | Refinance: increase = < 0 | 1.1672 |  | 1.1672 |
|  | Refinance: increase 0.1-3% | -0.3111 |  |  |
|  | Refinance: increase 3.1-10% | 0.0661 |  |  |
|  | Refinance: increase 10.1-19% | 0.0359 |  |  |
|  | Refinance: increase > 19% | 0 | 0 |  |
| Weight = sum of coefficients |  |  | -8.1203 | 16.3863 |
| Estimated Probability = exp(weight)/(1 + exp(weight)) |  |  | 0.030% | 100.000% |

Once the characteristics have been assigned weighting coefficients, they are summed and converted to an overall probability using the following formula:

estimated probability of not getting approved=EXP(SUM of coefficients)/(1+EXP(SUM of coefficients)

The result is the estimated probability of not getting approved for a loan. For example, if the estimated probability is 15%, this means that the borrower has an 85% chance of being approved for a loan.

Since it is desirable to communicate to the potential borrower the likelihood of getting approved, the foregoing result is desirably converted as follows and presented to the potential borrower:

probability of approval=1 -probability of not getting approved

It should be appreciated that, alternatively, the likelihood of getting approved may be calculated directly as follows:

probability of approval=1 -[EXP(SUM of coefficients)/(1 +EXP(SUM of coefficients)]

Referring back to FIG. 3, after the probability of approval is calculated (step 128), the process proceeds to decision 130 which queries whether an eligibility exception is present. For example, if the potential borrower is seeking a mortgage for greater than the value of the property, an eligibility exception will be present.

If a "yes" response is returned at decision 130, calculator 20 provides an explanation with the opportunity to start the process over (event 134). If a "no" response is returned, the process proceeds to step 138 where the final probability is checked.

The probable qualification process ends when the probable qualification determination is presented to the potential borrower in the form of a useful and readily understandable percentage chance of approval which can be easily and meaningfully compared against determinations made for other potential available loan products to permit the potential borrower to make an informed loan decision (display 140, or 142, or 144). It should be understood that the estimated probabilities for approval generated by calculator 20 closely approximate actual approval rates, thereby giving potential borrowers an accurate assessment of their likelihood of approval should they decide to proceed with the loan application.

As illustrated in Table 6 below, potential borrowers who have a probability of getting approved of 80% or higher will preferably be presented with the actual numerical estimate of the likelihood that their loan will be approved shown as a percentage (event 140). For potential borrowers who have a 60–80% probability of getting approved, the actual percentage will preferably not be displayed (event 142). For those potential borrowers who have an estimated probability of approval below 60%, the actual percentage will preferably not be displayed in favor of the displayed recommendation that they consult a loan counselor (event 144).

TABLE 6

For loans where 80% <= estimated probability of approval:

[estimated probability of approval, truncated so that the range is 80% to 99%] of people who answered the questions the way you did were approved for home loans. Since this free estimation tool does not guaranty that you'll be approved for a home loan, the way to find out for certain is to apply. To begin the online application, click the "Save and Apply Now" button below.
If you want to change any of the information you previously entered to see
how it affects your results, feel free to click the "Try Again" button below.
For loans where 60% <= estimated probability of approval < 80%:

The majority of people who answered the questions the way you did were approved. Since this free estimation tool does not guaranty that you'll be approved for a home loan, the way to find out for certain is to apply. We also encourage you to call our help center to speak to one of our loan consultants.
If you want to change any of the information you previously entered, feel free to click the "Try Again" button below.
For loans where the estimated probability of approval < 60%:

We have insufficient information to give you a response at this time. If you want to change any of the information you previously entered to see how it affects your results, feel free to click the "Try Again" button below. We also encourage you to call our help center to speak to one of our loan consultants. We will work with you to come up with the right home loan solution to meet your needs. Or you can proceed directly to the online application by clicking the "Save and Apply Now" button below.

FIGS. 4–13 depict preferred exemplars of computer Internet interface display screens used to guide a potential borrower through the online probable qualification process.

Referring to FIGS. 4 and 5, (steps 1 and 2, respectively) the potential borrower is prompted to provide responses to online questions which ask for information such as, for example: (i) the loan purpose (e.g., purchase or refinance), the number of borrowers who will be named on the loan application, (ii) the potential borrower's annual income, (iii) whether or not the potential borrower is self-employed, (iv) the potential borrower's monthly debt payments exclusive of current mortgage payment obligations or rent, (v) the current cash value of the potential borrower's assets, (vi) whether or not the subject property is a condominium, (vii) the intended use of the property (e.g., as a primary residence), (viii) the loan type (e.g., 30 year fixed rate), (ix) the anticipated purchase price, and (x) the available funds for down payment and closing. It should be understood that the funds available for down payment and closing cannot be greater than the input current cash value of the potential borrower's assets.

FIGS. 6 and 7 illustrate an effect of the selection of refinance as the loan purpose. As shown in FIG. 7, a somewhat different set of questions from the purchase scenario is presented to the potential borrower. Rather than questions regarding purchase price and funds for down payment and closing, the borrower is prompted to respond to questions concerning current mortgage balance, current property value and the desired loan amount.

Certain combinations of income, debt, loan amount/down payment, property value and loan type produce loan profiles that are not handled by calculator 20. Such loans are deemed to be ineligible. The determination of eligibility can be made after receiving inputs from steps 1 and 2 (regardless of whether purchase or refinance is selected). If calculator 20 determines that the input characteristics indicate ineligibility, a message such as depicted in FIG. 8 is displayed.

As stated above, it should be understood that the funds available for down payment and closing cannot be greater than the input current cash value of the potential borrower's assets. If the current cash value of assets is less than the amount indicated as funds available for down payment and closing costs, a message preferably such as depicted in FIG. 9 is displayed.

Step 3, the final step, is concerned with the potential borrower's credit. As depicted in FIG. 10, the potential borrower is prompted to provide responses to online questions which ask for information such as, for example: (i) whether or not in the previous ten (10) years the borrower filed for bankruptcy, or had a loan foreclosed, or had a tax lien filed against him/her, or had income garnished by a creditor, (ii) when the potential borrower opened his/her first credit account, (iii) the number of new credit accounts opened in the previous two (2) years, (iv) the last time the potential borrower was more than a month late on a credit account payment, (v) the total credit potentially available to the potential borrower, and (vi) the potential borrower's total outstanding credit balance. The last two questions combine to produce the percentage of credit used (i.e., money borrowed divided by borrowing limit) which, utilizing the tables set forth above, is used to arrive at the proxy credit score.

Step 3 does not depend on whether purchase or refinance was selected by the potential borrower as the loan purpose in step 1—but the borrower will not reach step 3 unless the loan was deemed to be eligible after completion of step 2. At the completion of step 3, the calculated probable qualification assessment is communicated to the potential borrower (e.g., after the borrower clicks on the "See Results" button on the previous screen depicted in FIG. 10).

If the calculated probability of approval is equal to or greater than 80%, the exact approval figure is presented to the potential borrower. In FIG. 11 for example, an 86% approval figure is displayed.

With probabilities of approval less than 80% but equal to or greater than 60%, percentage figures of approval are preferably not shown. The results message depicted in FIG. 12 however, is preferably displayed to users in this middle bracket.

Figure 13:
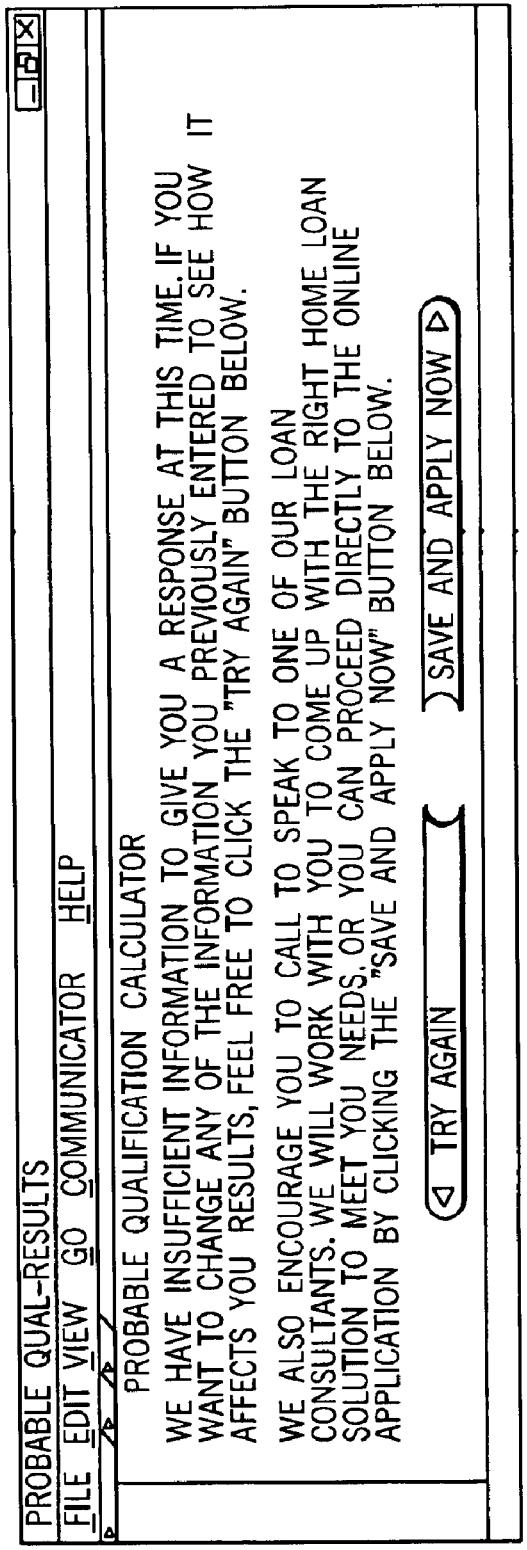

With a probability of approval of less than 60%, a message such as shown in FIG. 13 is preferably displayed to the potential borrower.

If the borrower chooses to apply for a loan, the loan originator makes a request for an underwriting decision. In response to such request, system 10, through underwriting engine 24, will provide to the loan originator an underwriting recommendation, lender and borrower findings, and a borrower/product specific interest rate as described in greater detail hereinafter. It should be recognized that if the borrower used probable qualification calculator 20, all applicable information will preferably populate the loan application to minimize data entry.

Prior to commencement of the underwriting process, it is desirable that a credit report be obtained on the potential borrower. The principal reasons for obtaining a credit report at this point are twofold: (1) to speed loan evaluation so that when the loan application is ready to be underwritten, the process need not be delayed while the credit report is obtained from outside credit agencies, and (2) to extract the potential borrower's real estate tradelines (e.g., outstanding mortgages, home equity loans) appearing on the credit report and present them to the borrower for clarification if necessary (e.g., that the tradeline has already been paid off, or that it will be paid off with the present contemplated loan, or that it is in error). Also, it should be appreciated that this reduces the level of data entry expected from the potential borrower as the borrower need not enter information concerning any tradelines. Moreover, this streamlines processing by the lender by eliminating the need for the lender to reconcile tradelines prior to underwriting.

A property assessment is also preferably obtained prior to underwriting for three principal reasons: (1) to speed loan evaluation, (2) to permit the potential borrower the opportunity to correct the address of the underlying property if necessary, and (3) to determine government HUD median income information for use by underwriting engine 24 in connection with the problem solution finding process or borrower guidance process described in greater detail hereinafter. Generally, the solution finding process is a process within underwriting that provides the loan originator with suggestions regarding potential areas for improvement in the event a borrower is not approved by underwriting engine 24 (e.g., the suggestion that the potential borrower apply more money toward the down payment to lower LTV). The solution finding process can use the HUD median income information to determine if the borrower meets low/moderate income requirements. This information is provided to the loan originator and can be used if the loan originator wishes to offer other types of products to the borrower.

Underwriting engine 24 provides to the loan originator one of two recommendations: (1) "approved," or (2) "refer to help center" or like message. It should be understood that the underwriting recommendation provided by the secondary mortgage market participant (preferably, Fannie Mae) through underwriting engine 24 for each loan submitted through system 10 does not constitute an approval or denial of the loan application by such secondary market participant. With respect to loan applications which receive a "refer to help center" recommendation, the loan originator will preferably work with the potential borrower, as appropriate, to (i) reconcile inaccurate information in the loan application, (ii) counsel the potential borrower regarding ways to improve the likelihood of obtaining an approval, and (iii) resubmit the application for re-underwriting through system 10.

For loan applications receiving an "approved" recommendation, underwriting engine 24 preferably communicates the conditions to be satisfied by the loan originator and the potential borrower before the application can proceed to closing. These conditions preferably include (i) the required level of collateral appraisal field work, if any, (ii) title insurance requirements, (iii) required information relating to verification of the potential borrower's income, assets, employment, and identity, and (iv) review and collection of required supporting documentation.

It should be understood that the foregoing verification process may require human participation. For example, in the case of a mortgage loan, a credit report is pulled and may require review, and, notwithstanding the waiver of the requirement for an appraisal by collateral assessment module 26 (as discussed in greater detail hereinafter), the loan originator might arrange at least for a cursory exterior-only inspection of the underlying real estate.

For loan applications receiving a "refer to help center" recommendation, underwriting engine 24 preferably provides problem solving or guidance information to facilitate borrower counseling by the loan originator regarding steps the potential borrower can take to improve the likelihood of approval within system 10. This is the problem solution process referred to above. Such guidance information preferably includes the amount the down payment needs to be increased, and the amount of debt that the potential borrower needs to payoff.

The process between underwriting and pricing is iterative. For each product on which system 10 is making an underwriting decision, pricing engine 22 is invoked to provide a borrower/product specific interest rate, and underwriting engine 24 underwrites the selected product as described in greater detail hereinafter. The interaction between underwriting and pricing is best illustrated in FIG. 14a.

Underwriting engine 24 underwrites the borrower for selected loan products as well as for other available products, and determines if the borrower is approved for each product. The response to the loan originator is all of the approved products and their associated interest rate quotes. This allows the borrower to review all the information, compare products and interest rates and select the product that best fits the borrower's needs.

Underwriting engine 24 also determines, for each approved product, the minimum amount of verification documentation (e.g., minimum assets to verify, minimum income to verify), selected loan underwriting parameters, assuming no other data changes, (e.g., maximum loan amount for approval, maximum loan amount for aggregating closing costs with the loan principal, and minimum refinance amount), as well as the maximums and minimums used to tailor the interest rate quote (maximum schedule interest rate and maximum number of points) and maximum interest rate approved for float up to a preselected increase over a current approved rate. It should be appreciated that this allows the potential borrower to provide only that information that is necessary for an approval decision, rather than all potentially relevant financial and other borrower information. This also reduces the processing burden on system 10.

Figure 14A:
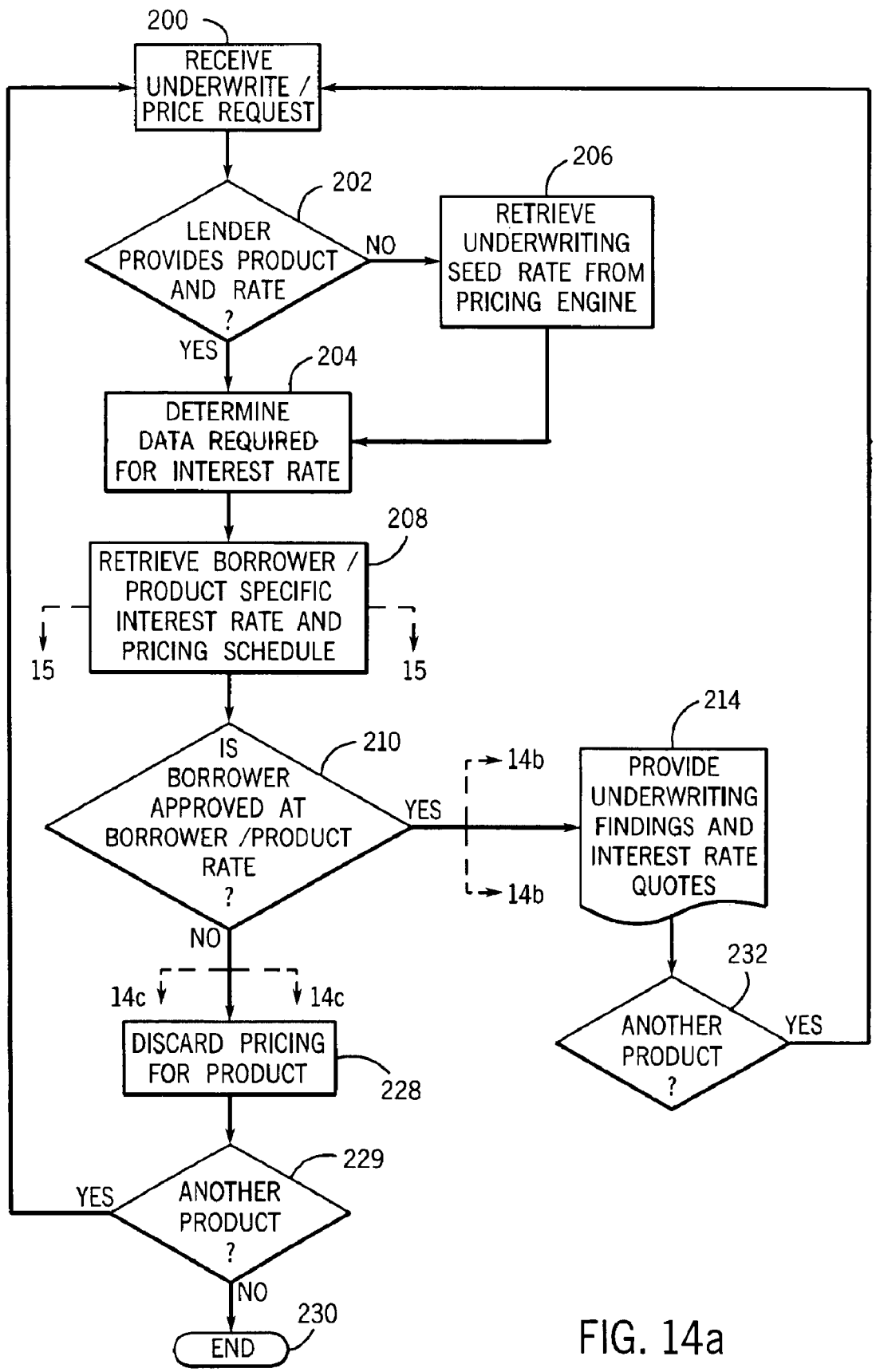
FIGS. 14a–14c are flow charts depicting the process interaction of the underwriting engine and the pricing engine according to an exemplary embodiment.

Referring now to FIG. 14a, when the loan originator makes an underwrite and price request, the request is received by underwriting engine 24 (step 200). If the loan originator provides the borrower selected product and indicative interest rate (decision 202), the process continues to step 204. If the loan originator is not providing an indicative interest rate with a selected product, underwriting engine 24 preferably requests a sample indicative interest rate (e.g., for a "typical" borrower) to seed or start the underwriting process for a specific product, and pricing engine 22 returns the seed interest rate (step 206). It should be understood that the seed interest rate may be the same as the enticement interest rate described herein.

Underwriting engine 24 then determines the data required to generate a borrower/product specific interest rate (step 204). Thereafter, underwriting engine 24 requests the borrower/product specific interest rate, and pricing engine 22 then calculates the borrower/product specific interest rate and the yield/point trade-off schedule to be returned to the loan originator in a manner described in greater detail hereinafter in connection with FIG. 15 (step 208).

At decision 210, underwriting engine 24 determines if the potential borrower is approved for the product at the borrower/product specific interest rate.

If approved, underwriting engine 24 tailors the yield/point trade-off schedule for the loan product by (i) limiting the upper interest rate boundary by the maximum schedule interest rate and the maximum schedule premium points, and (ii) limiting the lower interest rate boundary by the minimum schedule interest rate and the maximum schedule discount points (in a manner described below in connection with FIG. 14b). Underwriting engine 24 then provides the underwriting findings and interest rate quotes to the loan originator (step 214).

The maximum schedule interest rate is the maximum interest rate approved by underwriting engine 24; and the maximum schedule premium points are the maximum number of premium points approved by the underwriting engine. The minimum schedule interest rate is the minimum interest rate approved by underwriting engine 24; and the maximum schedule discount points are the maximum number of discount points approved by the underwriting engine.

Figure 14B:
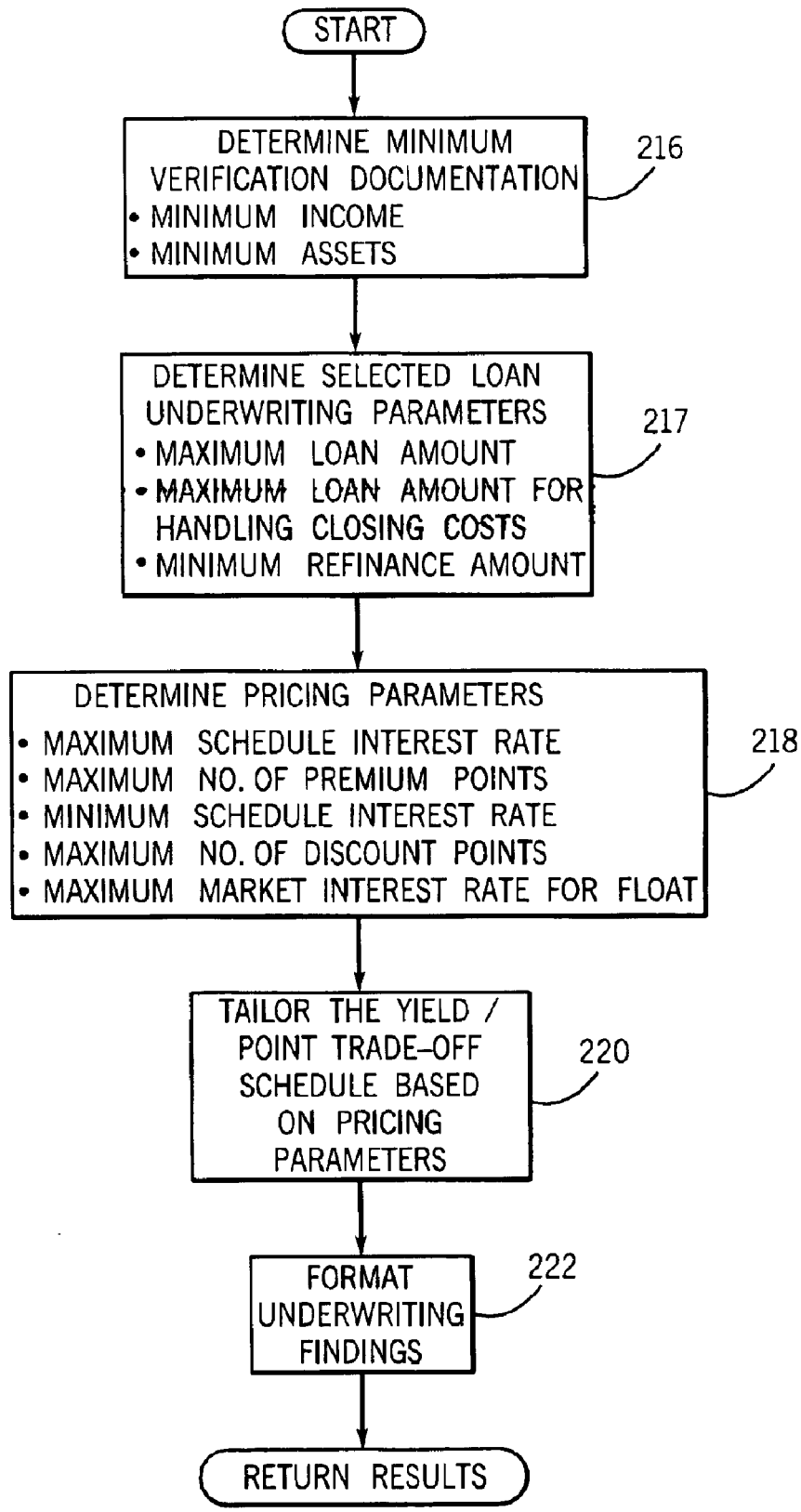

Referring to FIG. 14b, underwriting engine 24 preferably determines the minimum amount of verification documentation required for each approved borrower-specific loan product More particularly, underwriting engine 24 determines the minimum income and assets to verify, as appropriate (step 216).

The selected loan underwriting parameters are then determined (step 217). That is, approval for the maximum loan amount (and LTV), the maximum loan amount for aggregating closing costs with the loan principal, and the minimum refinance amount are determined, as appropriate, provided no other data changes.

The pricing parameters used to tailor the interest rate quote are then determined (step 218). That is, the maximum schedule interest rate and maximum number of premium points, and minimum schedule interest rate and maximum number of discount points, and maximum market interest rate approved for float (up to a preselected increase over a current approved rate) are determined, as appropriate.

The foregoing are then used to tailor the borrower/product specific interest rate quote (step 220). After step 220, the process proceeds to step 222 where the underwriting findings are formatted for presentation to the loan originator (see FIG. 14a, step 214).

Referring back to FIG. 14a, once the underwriting findings for a specific selected product are presented to the loan originator, underwriting engine 24 repeats the foregoing process to determine all approved products for the borrower until all such products have been underwritten (step 232). It should be appreciated that this places at the borrower's fingertips a valid, borrower-specific interest rate quote for all loan products for which the borrower has been approved (e.g., whether a 30 year fixed rate mortgage loan, a 15 year fixed rate loan, or other loan product) so that the borrower has a complete range of approved products with associated interest rates to select from.

Figure 14C:
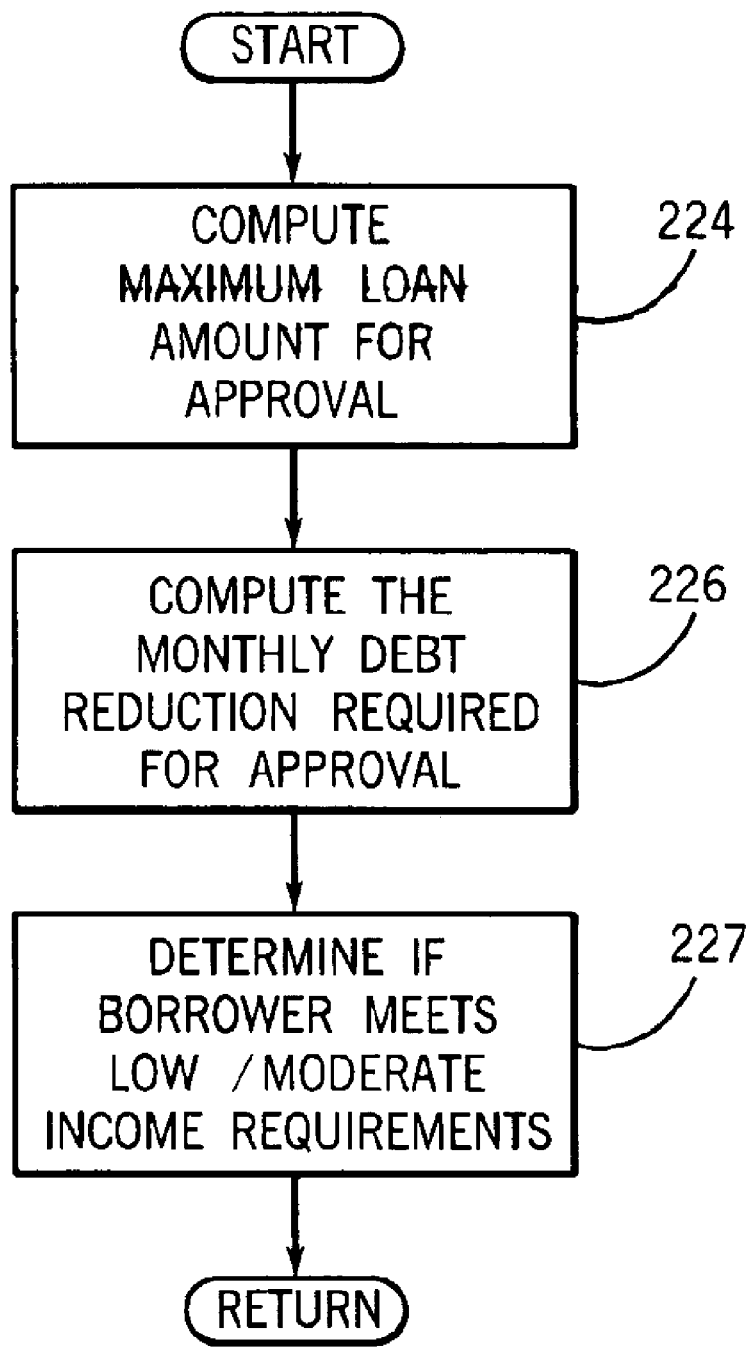

If the potential borrower is not approved for any product at step 210, underwriting engine 24 preferably executes a process to provide the loan originator with information designed to provide guidance with respect to problem areas that need to be addressed to improve the potential borrower's chances of approval for the product selected by the potential borrower. As best illustrated in FIG. 14c, underwriting engine 24 computes the maximum loan amount for approval (step 224), the monthly debt reduction required for approval (step 226), and determines if the potential borrower meets low/moderate income requirements for other types of loan products (step 227).

Referring to FIG. 14a, after execution of the problem solution routine, underwriting engine 24 discards the pricing schedule for the specific selected loan product (step 228). If underwriting engine 24 determines that there are additional loan products available for underwriting (step 229), the process repeats (i.e., returns to step 200). If there are no additional loan products to be underwritten, the process ends (event 230).

Pricing engine 22 of system 10 calculates the retail gross interest rate and points for each approved borrower/loan specific product combination passed through underwriting engine 24 to present to the borrower, as described in greater detail below. Pricing engine 22 also calculates a sales price (spot price) for each loan, i.e., the secondary market price that a secondary mortgage market purchaser will pay the loan originator for the individual loan.

The gross interest rate calculated by pricing engine 22 preferably includes a portfolio required yield and a customer risk-based price component. The portfolio required yield is a real time required yield based on current market conditions, and is preferably stored in a look up table residing in system 10. The portfolio required yield is also used to determine a spot price.

The yield/point trade-off schedule shows the relationship between points paid or rebated and the associated change in interest rate (preferably in ⅛ increments) for a given mortgage product. Yield is expressed as an offset from the par portfolio required yield, and points are expressed as offsets from par (100%). An example of a yield/point trade-off schedule is set forth in Table 7 below.

The customer risk-based price component includes a risk-based guaranty fee and a collateral risk price adjustment, among other appropriate fees and adjustments such as servicing fees and other borrower-specific credit risk price adjustments. The risk-based guaranty fee compensates the secondary mortgage market purchaser for its exposure to the credit risk posed by the particular borrower. The risk-based guaranty fee varies by loan product and is expressed in yield.

The collateral risk price adjustment is a per loan adjustment to the interest rate to compensate the secondary mortgage market purchaser for any risk arising from not requiring a property appraisal. Relying, in part, on historical data retrieved from a system database concerning the collateral (e.g., prior assessments of real estate, assessments of comparable real estate), collateral assessment module 26 determines the minimum type of appraisal, if any, that is required with respect to each individual loan application submitted for an underwriting recommendation through underwriting engine 24 of system 10. Collateral assessment module 26 may not require any appraisal or property field work. Alternatively, collateral assessment module 26 may require an appraisal with an interior and exterior inspection, or it may require that an appraisal with an exterior-only property inspection be performed and reported to underwriting engine 24. In the event that collateral assessment module 26 waives the appraisal or field work requirement, a loan level interest rate adjustment is made (i.e., the collateral risk price adjustment).

For loans with an LTV in excess of 80%, pricing engine 22 provides a low down payment rate adjustment to be added to the interest rate. The low down payment rate adjustment compensates the investor for potential borrower default associated with a lower down payment.

Figure 15:
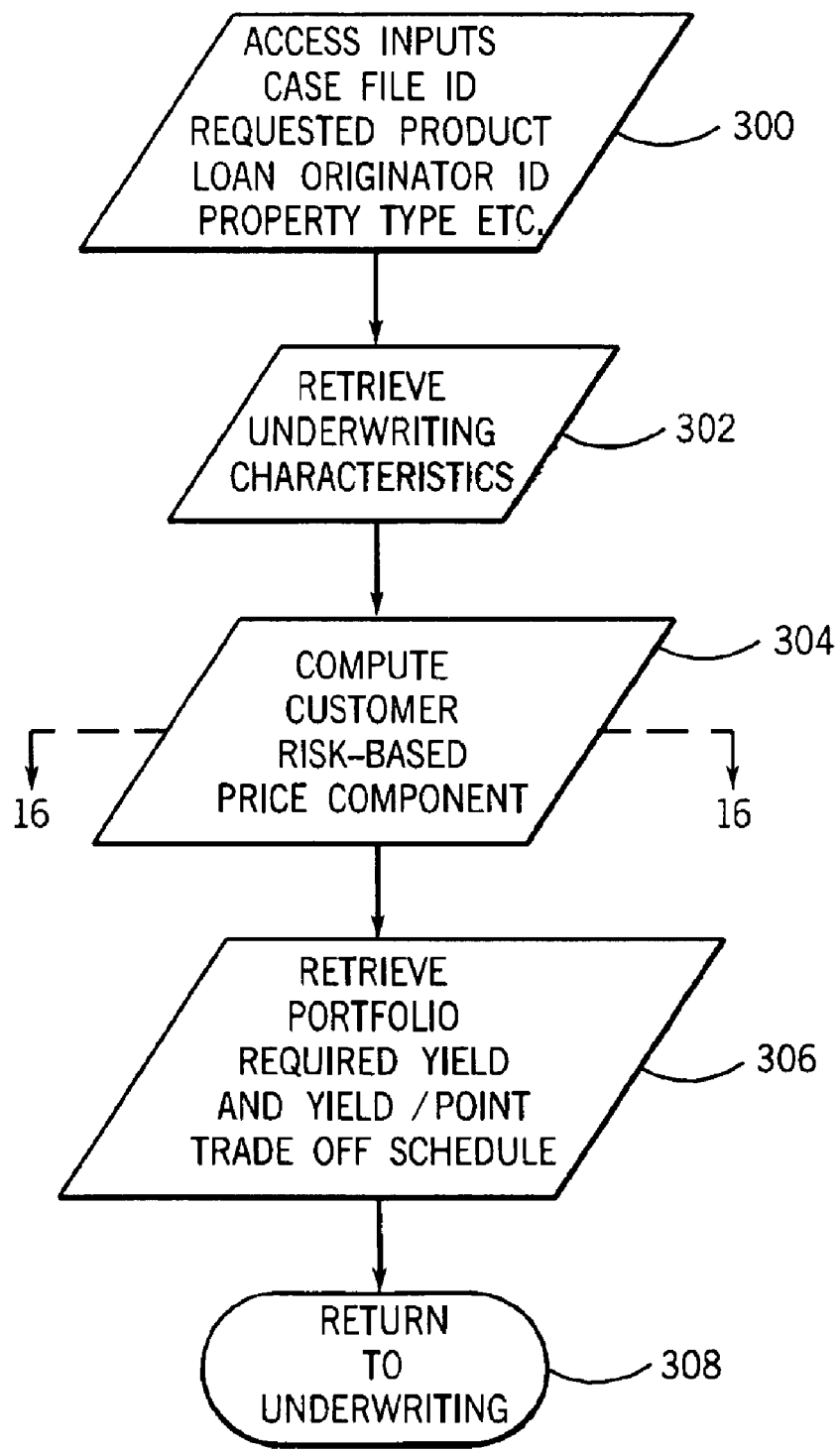
FIG. 15 is a flow chart depicting the risk-based pricing process according to an exemplary embodiment.

Referring now to FIG. 15, the following underwriting characteristics are preferably input into pricing engine 22 in order to begin the pricing process: (i) casefile ID, (ii) requested product, (iii) prospect or loan originator ID, (iv) combined loan-to-value (CLTV), (v) LTV, (vi) property type, (vii) loan purpose, (viii) cashout percentage, (ix) self-employment indicator (e.g., Y/N), (x) months of cash reserves, (xi) total expense ratio, (xii) appraisal field work type, and (xiii) appraisal waiver reason (step 300). Pricing engine 22 retrieves the foregoing underwriting characteristics (step 302). The process then proceeds to step 304 where pricing engine 22 calculates the customer risk-based price component.

Figure 16:
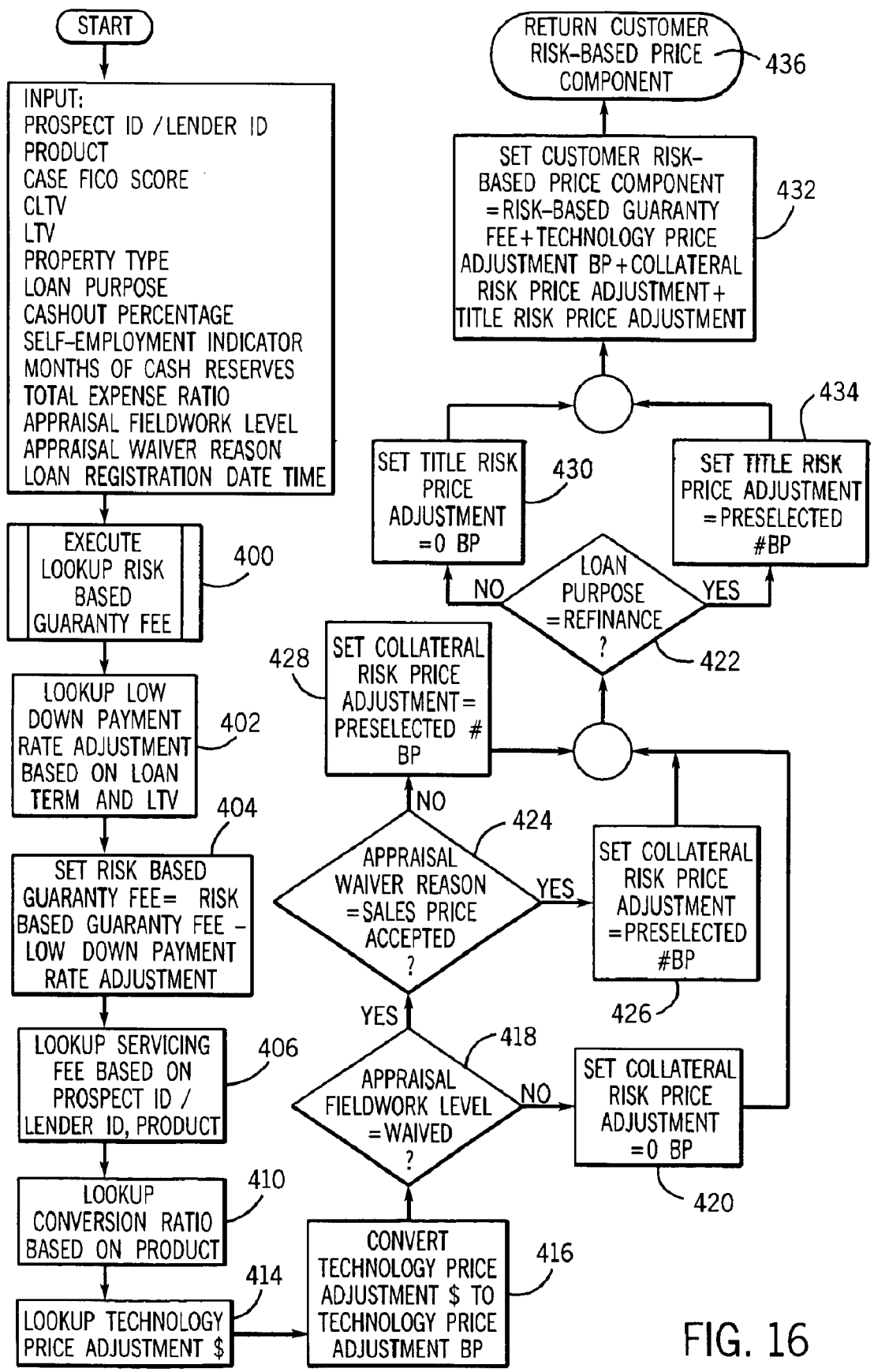
FIG. 16 is a flow chart depicting the process steps of calculating the customer risk-based price component in connection with the pricing process according to an exemplary embodiment.
Figure 17:
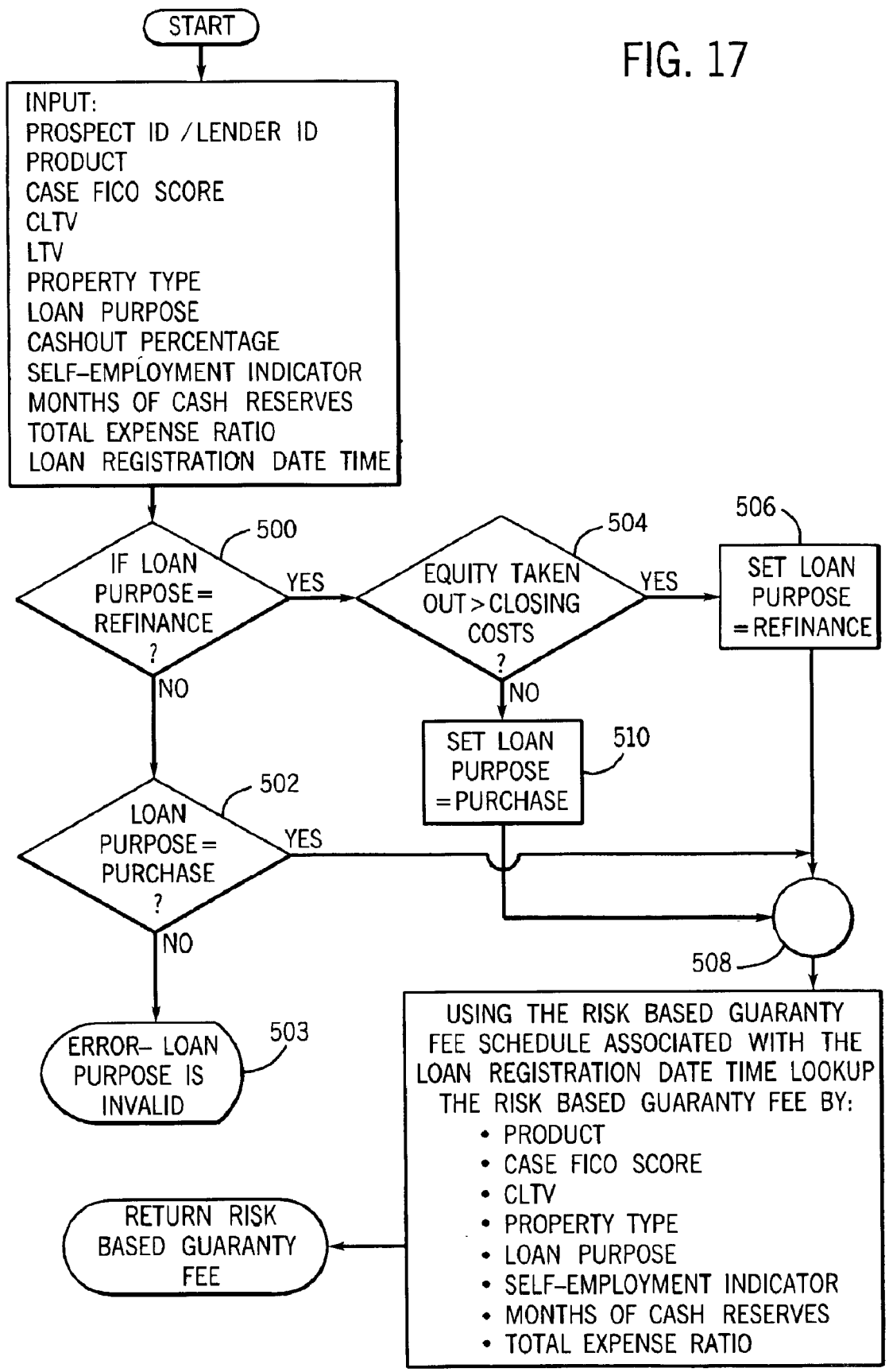
FIG. 17 is a flow chart depicting the process steps of retrieving the risk-based guaranty fee in connection with the pricing process according to an exemplary embodiment.

FIG. 16 illustrates the calculation of the customer risk-based price component. At step 400, pricing engine 22 retrieves the risk-based guaranty fee. FIG. 17 illustrates the process associated with looking up the risk based guaranty fee.

With access to the underwriting characteristics input at the beginning of the pricing process as illustrated in FIG. 17, the lookup process moves to decision 500 which queries if the loan purpose is refinance. If a "no" response is returned, the process moves to decision 502 which queries if the loan purpose is purchase. If a "yes" response is given at decision 500, i.e., if the loan purpose is refinance, the process moves to decision 504 which queries if the equity taken out exceeds closing costs. If a "no" response is given at decision 502, i.e., if the loan purpose is indicated as being neither a purchase nor a refinance, an error message indicating an invalid loan purpose is generated and the process terminates (event 503).

If, at decision 504 the equity taken out ("cashout percentage") exceeds closing costs (which represents an increased risk associated with the loan), the process proceeds to step 506 where the loan purpose is set as refinance, and then to step 508 as described below. If the equity taken out does not exceed closing costs, the process proceeds to step 510 where the loan purpose is set as purchase, and then to step 508. The risk associated with a loan refinance where the amount of equity taken out is not believed to be substantially greater than an amount sufficient to cover closing costs is equivalent to the risk associated with a loan the purpose of which is not refinance but rather purchase (hence, step 510).

If a "yes" response is returned at decision 502, i.e., if the loan purpose is purchase, the process moves to step 508.

At step 508, pricing engine 22, using the risk-based guaranty fee schedule stored in system 10 associated with the loan registration date and time, looks up the risk-based guaranty fee by the input underwriting characteristics, and makes the fee available for further use in the pricing process.

Referring back to FIG. 16, with the retrieval of the risk-based guaranty fee (step 400), pricing engine 22 retrieves the low down payment rate adjustment from a look up table (step 402) and adds it as yield to loans with an LTV over 80% to compensate the investor for potential borrower default associated with a lower down payment.

At step 404, pricing engine 22 sets the risk-based guaranty fee equal to the risk-based guaranty fee retrieved from the look up table less the low down payment rate adjustment (step 404). Then, based on prospect/loan originator ID and product, pricing engine 22 executes a look-up to retrieve the servicing fee (step 406).

Pricing engine 22 retrieves a product specific conversion ratio at step 410. Pricing engine 22 then retrieves a technology price adjustment (step 414) and converts it to a basis point value (step 416). It should be appreciated that converting dollar value to basis point value is accomplished by a mathematical calculation that is well known to those of ordinary skill in the art.

The process for computing the customer risk-based price component continues to decision 418 which queries whether the requirement for a field property appraisal has been waived. If a "no" response is returned at decision 418, the collateral risk price adjustment is set equal to zero basis points (step 420), and the process proceeds to decision 422, i.e., there is no reason to increase the interest rate of the loan to cover the risk associated with not requiring an appraisal. If a "yes" response is returned at decision 418, the interest rate of the loan needs to be increased to reflect the risk associated with not requiring an appraisal. Pricing engine 22 interrogates the appraisal waiver reason identification to determine the appropriate increase to the interest rate—that is, the process proceeds to decision 424 which queries if the reason for waiving the appraisal is that the market value of the underlying property (as evidenced by the sale price of the property) agrees with the property assessment and has been accepted by system 10.

If a "no" response is returned at decision 424, the collateral risk price adjustment is set equal to a preselected number of basis points (step 426), and the process proceeds to decision 422. If a "yes" response is returned at decision 424, the collateral risk price adjustment is set equal to another preselected number of basis points (step 428), and the process proceeds to decision 422. It should be understood that the foregoing basis points are preselected based on the risk associated with the loan.

At decision 422, pricing engine 22 queries if the loan purpose is a refinance. If a "no" response is returned, the title risk price adjustment is set equal to zero basis points (step 430), and the process proceeds to step 432. If a "yes" response is returned at decision 422, the title risk price adjustment is set equal to a preselected number of basis points (step 434), and the process proceeds to step 432.

At step 432, the customer risk-based price component is calculated as the sum of the risk based guaranty fee, the technology price adjustment, the collateral risk price adjustment, and the title risk price adjustment, among others. The resulting sum is then returned to the pricing process as yield (step 436), and the pricing process continues at step 332 in FIG. 15.

Referring back to FIG. 15, after the customer risk-based price component is calculated (step 304), the pricing process proceeds to step 306 where the portfolio required yield and yield/point trade-off schedule currently in effect or as of a specified date/time are retrieved from a look up table stored in system 10.

Table 7 below depicts an exemplar yield/point trade-off schedule in connection with underwriting and pricing a hypothetical loan (i.e., a 30 year fixed rate mortgage with a loan principal of $87,000, a LTV of 87% and a par portfolio yield of 7.758%). In reading the schedule set forth in Table 7 starting, for example, with the first discount increment 0.125 below par (0.00), for the first 12.5 basis points in yield, the number of discount points the borrower would pay would be 0.481 points. With a discount increment of 25 basis points in yield, the number of discount points the borrower would pay would be 0.969 points. It should be recognized that the transaction data set forth in Table 7 is not fully representative of all data utilized by system 10.

TABLE 7

| TRANSACTION: Underwrite & Price (Input) | |
|---|---|
| Application Data | This scenario is based on the following assumptions: |
| | 30 Year Fixed Rate Mortgage (FRM) $87,000 UPB |
| | 87 LTV 45 day closing |
| TRANSACTION: Underwrite & Price (Output) | |
| 1. CasefileID | 100000000000001 |
| 2. Product | 30 Year FRM |
| 3. Par Portfolio Yield | 7.758% |

TABLE 7-continued

| | | |
|---|---|---|
| 4. Customer Price Component | | 0.500% |
| 5. Low Down Payment Rate Adjustment | | 0.375% |
| 6. Yield/Point Trade-Off Schedule | | |
| Yield | Points | |
| (0.500) | (1.786) | |
| (0.375) | (1.355) | |
| (0.250) | (0.914) | |
| (0.125) | (0.462) | |
| 0.000 | 0.000 | |
| 0.125 | 0.481 | |
| 0.250 | 0.969 | |
| 0.375 | 1.465 | |
| 0.500 | 1.968 | |
| 0.625 | 2.475 | |
| 7. Maximum Schedule Interest Rate | | 9.125% |
| 8. Maximum Number of Points | | 2.475 |
| 9. Maximum LTV for Rate | | 90% |
| 10. Maximum Market Interest Rate for Float | | 10.625% |
| 11. Pricing as of Date/Time | | May 22, 2000 10:00 a.m. |

At the end of the pricing process, pricing engine 22 returns the par portfolio yield for the loan product, the customer risk-based price component, and the yield/point trade-off schedule for presentation to the potential borrower (step 308).

Desirably pricing engine 22 also generates sample interest rates that prospects or other loan originators can display to the general public (e.g., over the Internet) to entice potential borrowers to consider the loan products available through the prospect or other loan originator. Preferably, such enticement rates are customized for each prospect/loan originator and will reflect either interest rates that a "typical" borrower may expect to receive, or rates that a fictitious highly qualified borrower may expect to receive to illustrate the best interest rates that the prospect/loan originator can provide.

As interest rates change with market fluctuations, pricing engine 22 preferably generates a new set of enticement rates for each prospect/loan originator. The system has the ability to customize a "typical" borrower for each prospect/loan originator. Additionally, each prospect/loan originator can create a plurality of "typical" borrowers in order to show ranges or interest rates which may best match the characteristics of target potential borrowers.

Following the underwriting and pricing process described above, the borrower has the ability to rate lock. That is, the borrower can select a product, interest rate/point combination and a rate lock option (i.e. float or lock) online. A locked rate is fixed at the time the borrower elects or is required by the loan originator to lock.

A benefit of system 10 is that if a borrower decides to float, they can request and receive an online, up-to-the-minute interest rate quote that is unique to them. This is not a sample interest rate. Rather, it is an actual borrower/product specific "live" interest rate quote that is available to the borrower to lock in.

Also, the loan originator may initiate a request for a spot sales price for a particular loan in the system pipeline at any time after the loan has been rate locked. It should be appreciated that this enables the loan originator to value the individual loan in the secondary market without selling the loan.

Figure 18A:
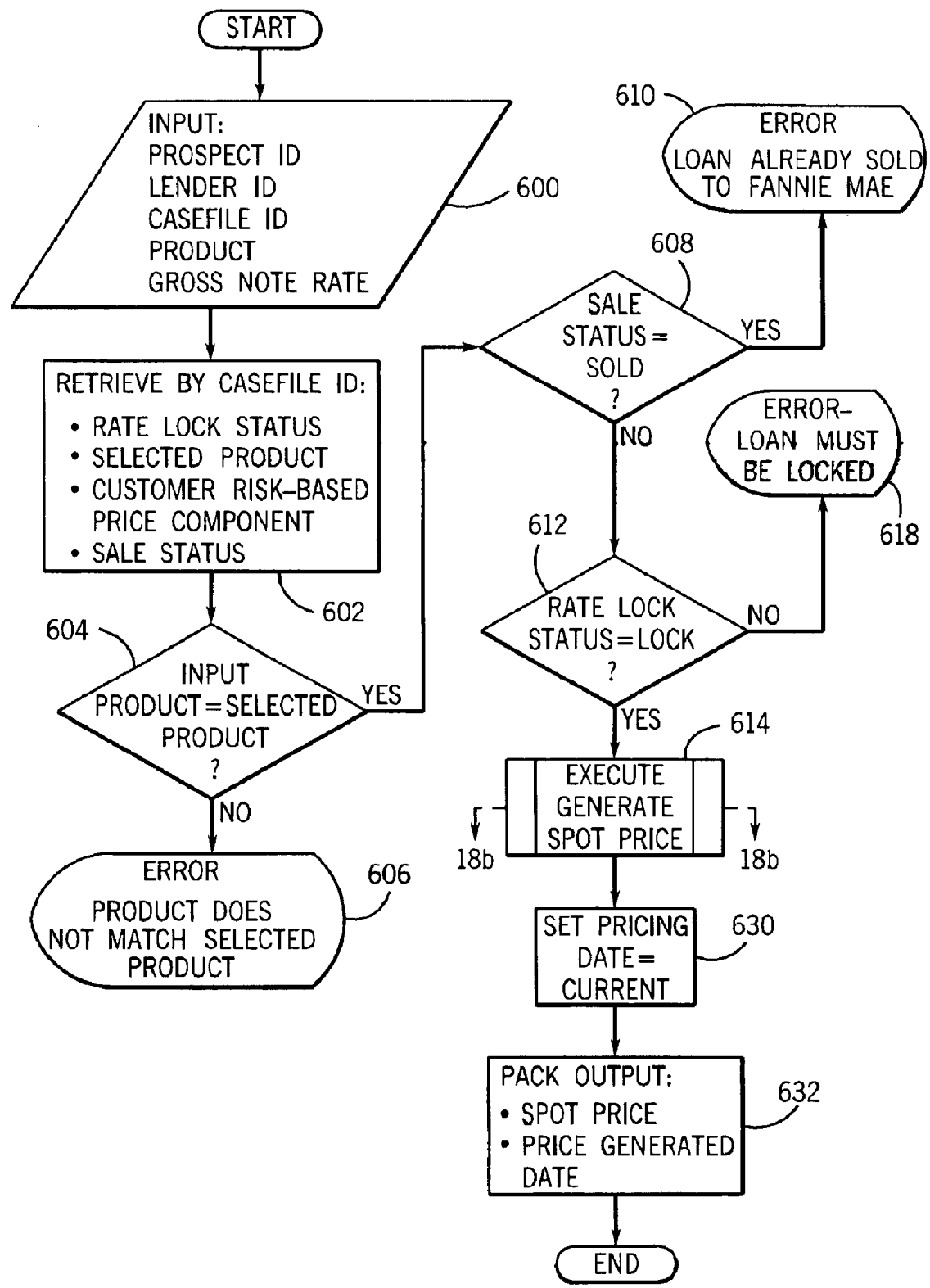
FIGS. 18a–18b are flow charts depicting the process steps of generating a spot price according to an exemplary embodiment.

Referring to FIG. 18a, to request a spot price, the loan originator provides information to pricing engine 22 including the gross interest rate (step 600). Once the information is provided at step 600, the process proceeds to step 602 where information concerning the selected loan product, the rate lock status, the customer risk-based price component, and the sale status is retrieved by casefile ID.

The process then continues to decision 604 where pricing engine 22 verifies that the input product is the selected product. If not, an error message is generated indicating that the product does not match the selected product and the process terminates (event 606). If the input product is indeed the selected product, the process proceeds to decision 608 which queries if the loan has been sold.

If a "yes" response is returned at decision 608, an error message is generated indicating that the loan has already been sold to a secondary mortgage market purchaser, preferably, Fannie Mae (event 610). If a "no" response is given, the process moves to decision 612 which queries if the rate status is lock.

Figure 18B:
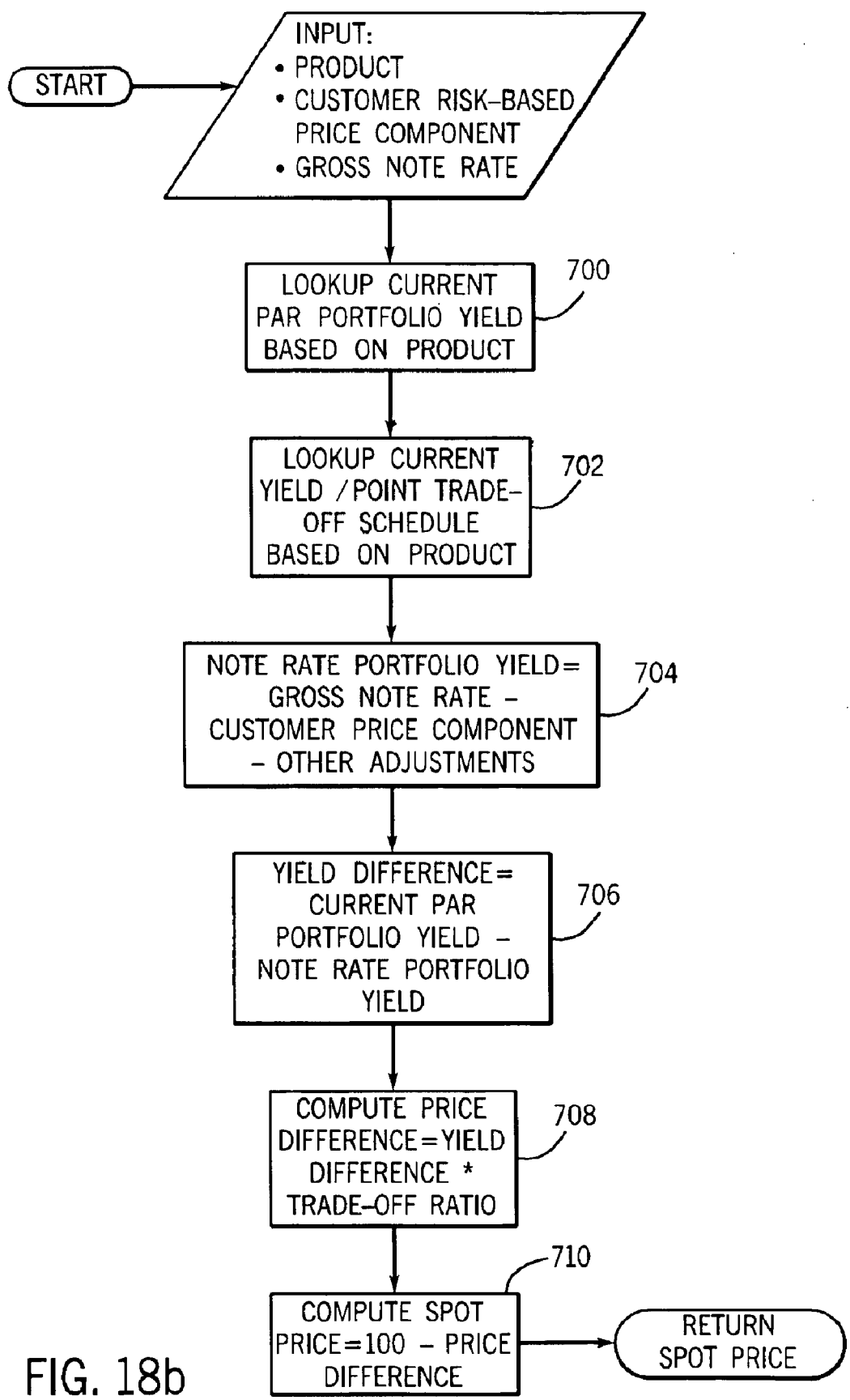

If the rate status is lock, the process moves to step 614 and a spot price is generated as described in greater detail below in connection with FIG. 18b. If a "no" response is returned at decision 612, i.e., if the rate status is not lock (float), an error message is generated indicating that the loan must be locked in order to obtain a spot price (event 618).

At step 614, pricing engine 22 generates the spot price utilizing input data including the product, customer risk-based price component, and gross interest rate. Referring now to FIG. 18b, pricing engine 22 retrieves the current product specific par portfolio yield from a look up table (step 700). Pricing engine 22 then retrieves the current product specific yield/point trade-off schedule (step 702).

At step 704, pricing engine 22 calculates the interest rate portfolio yield as the gross interest rate less the customer risk-based price component less other appropriate adjustments. At step 706, pricing engine 22 calculates the yield difference as the current par portfolio yield less the interest rate portfolio yield. At step 708, pricing engine 22 calculates the price difference as the yield difference multiplied by an appropriate trade-off ratio (i.e., what is paid in price for one basis point in yield). Then, the spot price is calculated as 100 minus the price difference (step 710).

Referring back to FIG. 18a, with the spot price calculated, pricing engine 22 sets the pricing date equal to the current date (step 630) and packages the spot price and the current date as output (step 632).

To sell a loan to a secondary mortgage market purchaser in the secondary market, the loan originator initiates a sell loan transaction via pricing engine 22. Upon receiving the request, pricing engine 22 confirms that the loan originator has provided all required underwriting characteristics (e.g., casefile ID, product, and gross interest rate), and calculates the sales price for delivery to the loan originator. This necessitates that pricing engine 22 carry out the additional step of setting the acquisition price equal to the spot price (as calculated above) at the current date (i.e., the date of the acquisition).

In accordance with the foregoing, an online system and process are disclosed for enabling a potential borrower to obtain (from a prospect in the mortgage business or other loan originator) a meaningful, real time, anonymous assessment of the likelihood of being approved for a loan based on limited information provided by the potential borrower without the need for a credit report or a property appraisal. The system further provides an online, real time, firm underwriting decision on each loan product offered by the lender for which the borrower is eligible regardless of whether or not the borrower has identified actual collateral to collateralize the loan, and the opportunity to aggregate fees and closing costs with the loan principal.

The system (i) identifies available loan products (e.g., mortgage loans) to potential borrowers, (ii) underwrites and prices loan products for which such borrowers are eligible based on their specific financial and other relevant characteristics, and (iii) facilitates the sale of mortgage loans to secondary mortgage market purchasers. This is accomplished in real time over the Internet or other global communications network.

Borrower information submitted to the loan originator electronically is evaluated in real time by the system software which determines, before the actual loan application is submitted, and without the need to obtain a credit report or a collateral appraisal, how likely it is that the potential borrower's loan application will be approved. The system communicates the qualification determination to the potential borrower in the form of a useful and readily understandable percentage likelihood of approval which can be easily and meaningfully compared against determinations made with regard to other potential available loan products to permit the potential borrower to make an informed loan decision. This is not a mere affordability calculation such as is common in the art.

If the borrower chooses to apply for a loan, the system underwrites the loan product selected by the borrower as well as all other loan products offered by the lender for which the borrower is eligible. During underwriting, the system evaluates a credit report on the borrower and makes an automatic assessment of underlying collateral based, in part, on historical data stored in a database concerning the collateral (e.g., prior assessments of real estate, assessments of comparable real estate), assuming, of course, that the borrower has identified collateral. The system and process do not require the borrower to identify collateral to obtain an underwriting decision.

Assuming that collateral is identified, the system may recommend an appraisal with a full interior and exterior property inspection, an appraisal limited to an exterior-only property inspection, or no appraisal. In most cases, such automatic assessments avoid the need for an appraisal involving an interior and exterior inspection of underlying collateral, and avoid the associated cost. However, the risk associated with not performing an appraisal is factored into the loan pricing as a per loan adjustment to the interest rate. Also, during the underwriting process, the system determines the criteria for aggregating or bundling closing costs with the loan principal.

In the event that the borrower is not approved for any loans during the underwriting process, the lender is provided with information identifying problem areas with respect to the borrower's loan application and suggested areas for improving the borrower's chances for approval. The borrower may be referred to a help center to receive the benefit of such information and suggestions.

The system calculates interest rate quotes (i.e., percentage interest rates and points) for presentation by the lender to the borrower for all loan products offered by the lender for which the borrower is approved during underwriting. The calculated interest rate quotes are customized to the borrower based on the specific financial profile and other relevant characteristics of the particular borrower (drawn from the information provided by the potential borrower and by the credit report and other information obtained by the system), and on the credit risk to the loan originator and secondary mortgage market participant posed by the borrower.

Following underwriting and pricing, the borrower may fix or lock in an interest rate and points, or the borrower may choose to float. If the borrower decides to float, the borrower can request and receive an online, up-to-the-minute interest rate quote that is customized to the borrower.

After the borrower has selected a particular loan option, the information provided by the borrower in applying for the loan (e.g., employment information, credit history, collateral information, etc.) is verified by the loan originator. The verification process may require human participation. For example, in the case of a mortgage loan, the credit report on the borrower may require review, or the loan originator might arrange at least for a cursory exterior-only inspection of the underlying real estate.

Additionally, the system and process determine the spot price for a loan. The spot price is the price that the loan originator may expect to receive in the secondary mortgage market when it sells the loan to a secondary mortgage market purchaser. The spot price allows the loan originator to value a loan in the secondary market without committing (selling) the loan. After the loan is closed, the lender can commit (sell) the loan to the secondary mortgage market purchaser at a price determined by the system and process disclosed herein.

The system utilizes known computer hardware and electronic communications links to effect the automated implementation of various aspects of the disclosed methods.

Accordingly, the system and process provide for online loan qualification, application, approval, underwriting, and pricing, and enable non-traditional players ("prospects") and traditional players to originate loans without having to build the requisite infrastructure. On the lender side, the system and process provide prospects in the mortgage business, or other loan originators, with market sensitive interest rates that may be presented to potential borrowers to attract business. These rates may be customized for each prospect or other lender.

The system and process provide a streamlined loan process to provide a positive experience for users.

The system and process give a potential borrower a meaningful and readily understandable assessment of the likelihood of being approved for a loan in real time, without the need for a credit report or a collateral appraisal.

The system and process provide a borrower with an online, real time, firm underwriting decision on each loan product offered by the lender for which the borrower is eligible regardless of whether or not the borrower has identified actual collateral for the loan.

The system and process which provide a borrower with the opportunity to aggregate closing costs with the loan principal.

The system and process calculate an interest rate and points specific to the individual potential borrower based on the credit risk to the lender and the secondary mortgage market purchaser posed by the borrower in connection with a specific loan product for which the borrower is eligible.

The system and process which provide for reduced loan origination costs resulting from requiring only limited appraisal field work or no appraisal field work, as appropriate.

The loan system and process which provide reduced documentation verification requirements.

Additionally, the system and process minimize the uncertainty faced by the loan originator when dealing with the secondary mortgage market by providing the loan originator with the acquisition price it may expect to receive for an individual loan (not an aggregate of loans) in the secondary market from the secondary mortgage market purchaser. The system and process which offer the loan originator an indication of the price it may expect to receive for an individual loan in the secondary mortgage market from the secondary mortgage market purchaser.

The system and process look up predefined factors so that the calculations required are simpler and the hardware requirements are decreased.

The disclosed method accordingly comprises the various steps and the relation of one or more of such steps with respect to each of the others, and the disclosed system embodies features of construction, combinations of elements, and arrangement of parts which are adapted to effect such steps, all as exemplified in the foregoing detailed disclosure.

It will thus be seen that the advantages set forth above, among those made apparent from the preceding description, are efficiently attained and, since certain changes may be made in carrying out the above method and in the constructions set forth for the system without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A system for determining an interest rate quote and points for a mortgage loan that are specific to a borrower, comprising:
    input means for obtaining borrower and mortgage loan information;
    means for retrieving underwriting characteristics;
    means for calculating the interest rate quote and points based on the borrower and mortgage loan information and based on the underwriting characteristics, the means for calculating including
        means for retrieving a required yield which reflects market conditions in a secondary mortgage market including being indicative of a price that is offered for the mortgage loan in the secondary mortgage market;
        means for determining an adjustment to the required yield associated with the mortgage loan based on credit risk posed by the borrower, the credit risk adjustment being determined as a function of at least a credit score, a loan-to-value ratio, and a mortgage loan purpose for the mortgage loan and the borrower; and
        means for determining other adjustments to the required yield based on other parameters related to the mortgage loan and/or the borrower; and
        wherein the interest rate quote and points is calculated as a function of the required yield adjusted by the credit risk adjustment and the other adjustments.

2. A system according to claim 1, wherein the mortgage loan is a mortgage refinance.

3. A system according to claim 1, wherein the mortgage loan is one of a plurality of mortgage loan products, and wherein the means for calculating calculates adjustments to required yields associated with each of the plurality of mortgage loan products to determine interest rate quotes for each of the plurality of mortgage loan products.

4. A system according to claim 3, further comprising means for receiving a borrower selection of the one of the plurality of mortgage loan products.

5. A system according to claim 1, further comprising means for generating interest rates for display to potential borrowers.

6. A system according to claim 5, wherein the means for generating is configured to generate different interest rates for different lenders.

7. A system according to claim 6, wherein the means for generating is configured to generate different interest rates for different lenders and for different products offered by the different lenders.

8. A system according to claim 1, wherein the interest rate is further adjusted based on a maximum schedule interest rate, a maximum schedule premium points, a minimum schedule interest rate, a maximum schedule discount points, and a maximum market interest rate for float.

9. A system according to claim 1, further comprising means for modifying a yield/point trade-off schedule for the loan product by (i) limiting an upper interest rate boundary by a maximum schedule interest rate and a maximum schedule premium points, and (ii) limiting a lower interest rate boundary by a minimum schedule interest rate and a maximum schedule discount points.

10. A system according to claim 1, wherein the means for calculating further calculates adjustments based on product characteristics of the mortgage loan.

11. A system according to claim 1, wherein the means for calculating further calculates an adjustment to the required yield for loans with a loan-to-value ratio in excess of a predetermined value, the adjustment being configured to compensate an investor in the mortgage loan for potential borrower default associated with a lower down payment.

12. A system according to claim 1, wherein the other parameters related to the mortgage loan and/or borrower include collateral risk associated with not requiring a collateral appraisal.

13. A system according to claim 1, wherein the underwriting characteristics are related to underwriting guidelines of a secondary mortgage market purchaser.

14. A system according to claim 1, wherein the interest rate quote is used to determine a price that may be obtained for the mortgage loan in the secondary mortgage market.

15. A system according to claim 13, wherein the underwriting characteristics and the interest rate quote and points are used to determine an underwriting recommendation.

16. A system according to claim 13, further comprising means for generating an underwriting recommendation for the mortgage loan application based on the underwriting characteristics and based on underwriting guidelines of a secondary mortgage market purchaser.

17. A system according to claim 1, wherein the system is further configured to provide a display of information pertaining to the interest rate quote and points specific to a borrower to the borrower by way of the Internet.

18. A system according to claim 1, wherein the other adjustments include a servicing fee adjustment.

19. A system according to claim 1, wherein the means for retrieving underwriting characteristics retrieves at least the following underwriting characteristics: (i) casefile ID, (ii) requested product, (iii) prospect or loan originator ID, (iv) combined loan-to-value, (v) loan to value, (vi) property type, (vii) loan purpose, (vii) cashout percentage, (ix) self-employment indicator, (x) months of cash reserves, and (xi) total expense ratio.

20. A system according to claim 1, wherein the credit risk adjustment further includes a risk-based guarantee fee.

21. A system according to claim 19, wherein the means for determining an adjustment looks up the risk-based guarantee fee in a risk-based guarantee fee schedule.

22. A system according to claim 20, wherein the underwriting characteristics are used as input to the risk-based guarantee fee schedule.

23. A system according to claim 1, wherein the means for calculating is further configured to calculate generic interest rates that are non-borrower specific and that are displayed as enticement rates.

24. A system according to claim 1, wherein the means for calculating the interest rate quote and points is accessible by the borrower via the Internet.

25. A system according to claim 1, wherein the required portfolio yield is used to generate a spot price for the mortgage loan.

* * * * *